(12) United States Patent
Prada-Silvy et al.

(10) Patent No.: US 12,071,347 B2
(45) Date of Patent: Aug. 27, 2024

(54) CARBON-CARBON NANOTUBE HYBRID MATERIALS AND METHODS OF PRODUCING SAME

(71) Applicant: Chasm Advanced Materials, Inc., Canton, MA (US)

(72) Inventors: Ricardo A. Prada-Silvy, Norman, OK (US); David J. Arthur, Norwood, MA (US)

(73) Assignee: Chasm Advanced Materials, Inc., Canton, MA (US)

( * ) Notice: Subject to any disclaimer, the term of this patent is extended or adjusted under 35 U.S.C. 154(b) by 201 days.

(21) Appl. No.: 17/515,520

(22) Filed: Oct. 31, 2021

(65) Prior Publication Data

US 2022/0048772 A1 Feb. 17, 2022

Related U.S. Application Data

(63) Continuation of application No. PCT/US2020/030426, filed on Apr. 29, 2020.
(Continued)

(51) Int. Cl.
   *C01B 32/162* (2017.01)
   *B82Y 30/00* (2011.01)
   *B82Y 40/00* (2011.01)
(52) U.S. Cl.
   CPC .............. *C01B 32/162* (2017.08); *B82Y 30/00* (2013.01); *B82Y 40/00* (2013.01);
(Continued)

(58) Field of Classification Search
   CPC .............. C01B 32/162; C01B 2202/34; C01B 2202/36; C01B 32/194; C01B 32/21; C01B 32/354; C01B 32/16; C01B 32/158; C01B 32/159; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; B82Y 30/00; B82Y 40/00; C01P 2004/03; C01P 2004/13; C01P 2004/64;
(Continued)

(56) References Cited

U.S. PATENT DOCUMENTS

| 5,443,929 A | 8/1995 | Yamamoto et al. |
| 9,455,094 B2 | 9/2016 | Tour et al. |

(Continued)

OTHER PUBLICATIONS

Zheng, et al., Hairy graphite of high electrochemical performances prepared through in-situ decoration of carbon nanotubes, Electochimica Acta 2017; 233: 229-236 (Year: 2017).*
(Continued)

*Primary Examiner* — Daniel C. McCracken
(74) *Attorney, Agent, or Firm* — Brian M. Dingman; Prince Lobel Tye LLP

(57) ABSTRACT

Carbon-carbon nanotube (CNT) hybrid materials, and methods of producing the hybrid materials. The hybrid materials include carbon particles and CNTs on the surface of the particles. The CNT comprises more than about 3.2 weight percent of the hybrid material.

9 Claims, 18 Drawing Sheets

Related U.S. Application Data

(60) Provisional application No. 62/841,104, filed on Apr. 30, 2019.

(52) U.S. Cl.
CPC ...... *C01P 2004/03* (2013.01); *C01P 2004/13* (2013.01); *C01P 2004/64* (2013.01); *C01P 2006/80* (2013.01)

(58) Field of Classification Search
CPC ........ C01P 2006/80; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | |
|---|---|---|
| 2008/0233402 A1 | 9/2008 | Carlson et al. |
| 2008/0248310 A1 | 10/2008 | Kim et al. |
| 2009/0220767 A1* | 9/2009 | Schlogl ............... B01J 23/745 428/323 |
| 2010/0254885 A1 | 10/2010 | Menchhofer |
| 2012/0070667 A1 | 3/2012 | Malet et al. |
| 2017/0267530 A1 | 9/2017 | Harutyunyan et al. |

OTHER PUBLICATIONS

Fan, et al., Self-Oriented Regular Arrays of Carbon Nanotubes and Their Field Emission Properties, Science 1999; 283: 512-514 (Year: 1999).*
Veziri, et al., Growth and optimization of carbon nanotubes in activated carbon by catalytic chemical vapor deposition, Microporous and Mesoporous Materials 2008; 110: 41-50 (Year: 2008).*
Pyrolysis, accessed online at https://www.britannica.com/science/pyrolysis on Jan. 18, 2024 (Year: 2024).*
Definition of "spheroid," accessed online at https://www.merriam-webster.com/dictionary/spheroid on Jan. 23, 2024 (Year: 2024).*
Definition of "-ize," accessed online at https://www.merriam-webster.com/dictionary/-ize on Jan. 23, 2024 (Year: 2024).*
Mundszinger, et al., Morphology and texture of spheroidized natural and synthetic graphites, Carbon 2017; 111: 764-773 (Year: 2017).*
Zheng, Huiyuan, et al; Hairy Graphite of High Electrochemical Performance Prepared Through In-Situ Decoration of Carbon Nanotubes; Electrochimica Acta 233, vol. 233, Apr. 10, 2017, pp. 229-236. Last downloaded from the internet on Jan. 11, 2022; https://www.sciencedirect.com/science/article/abs/pii/S0013468617304504.
Zhao,J., et al; Carbon Nanotube Growth in the Pores of Expanded Graphite by Chemical Vapor Deposition; Carbon 47, Jun. 2009, vol. 47, Issue 7, pp. 1747-1751. Last downloaded from the internet on Jan. 11, 2022; https://www.sciencedirect.com/science/article/abs/pii/S0008622309001225.
The International Preliminary Report on Patentability issued by the International Bureau of WIPO on Nov. 2, 2021 for PCT Application No. PCT/US2020/030426.
The International Search Report mailed Sep. 4, 2020 by the International Searching Authority for application No. PCT/US2020/030426.

* cited by examiner

PRIOR ART

CARBON-CARBON NANOTUBE HYBRID MATERIALS AND METHODS OF PRODUCING SAME

CROSS-REFERENCE TO RELATED APPLICATIONS

This application claims priority of PCT/US20/30426, filed on Apr. 29, 2020, which claimed priority of Provisional Patent Application 62/841,104 filed on Apr. 30, 2019. The entire disclosures of these two applications are incorporated herein by reference.

BACKGROUND

This disclosure relates to a carbon-carbon nanotube hybrid material.

Carbon Nanotubes (CNTs) are tubular graphene with nanoscale diameter (about 1 nm to 10's of nm) and high aspect ratio (length to diameter ratio of hundreds to thousands). CNTs are the strongest material known per unit weight, yet they are tough and flexible. CNTs of high quality are highly crystalline and have very high chemical stability and high thermal stability (>500° C.). CNTs have higher electrical conductivity per unit weight than any of the Carbon particles comprising Natural Graphite, Synthetic Graphite, Graphene, Carbon Black, Activated Carbon, etc. (except high-quality Graphene, which can be similar). In most of the applications of CNTs, it is very desirable to incorporate CNTs in combination with Carbon particles that are already being used in these applications to further enhance performance. There are some successful commercial examples of this, all of them using physical mixtures of CNTs and Carbon particles: CNTs and Natural Graphite in anodes to extend Li-ion battery cycle life and enhance charge/discharge rates; CNTs and Natural Graphite in lead acid batteries to extend cycle life; and CNTs and Carbon Black in cathodes to extend Li-ion battery cycle life.

There would be many more commercial examples of CNTs combined with Carbon particles if it were more affordable and more practical to effectively integrate CNTs into these applications. Traditional CNT synthesis methods result in a CNT production cost per unit weight that is much higher (10 to 1,000×) than the Carbon particles they are aiming to enhance. Thus, CNTs are typically only affordable when a tiny amount of CNT is used (typically <10% and more typically <1% of the weight of Carbon particles used). This economic constraint obviously limits the impact that CNTs can make on enhancing performance. Additionally, creating physical mixtures of CNTs and Carbon particles typically requires creating a dispersion of CNTs in a fluid. However, this can be costly, as CNTs are notoriously difficult to disperse (during synthesis, they self-assemble into ropes and/or they become highly entangled in a "bird's nest" structure). To properly disperse the CNTs in the fluid requires significant energy and non-conventional processing, which can result in significant damage to the CNTs—creating sidewall defects (compromising CNT properties) and/or reducing the length of the CNTs (compromising the desirable high aspect ratio, which in turn compromises the ability for the CNTs to enhance the properties of the Carbon particles). Furthermore, the desirable high aspect ratio of the CNTs greatly limits the concentration of CNTs that can be dispersed into a fluid (typically <10% and more typically <1% of the fluid) due to very significant increases in viscosity of the fluid mixture. This rheological constraint limits the amount of CNT that can be added to the physical mixture of CNTs and Carbon particles, which limits the impact that CNTs can make on performance.

There is another limitation of creating physical mixtures of CNTs and Carbon particles that is worth noting. In many cases, the greatest enhancement of Carbon particle properties will happen when the CNTs are located at the surface of the Carbon particles. The ideal structure would be to create a relatively dense coating or "carpet" of CNTs on the surfaces of the Carbon particles, but this structure is challenging to create during physical mixing. Many of the CNTs will remain agglomerated with each other and not come in contact with the Carbon particles. Also, the practical constraints cited above makes it impossible to sufficiently carpet the surface of the Carbon particles with CNTs to maximize properties.

SUMMARY

Novel hybrid materials (composites) comprising Carbon particles "carpeted" with Carbon Nanotubes (CNTs) can be made via in-situ synthesis of CNTs on the surface of Carbon particles. The resulting CNT hybrids (composites) can have remarkably superior properties than the Carbon particles alone. The resulting CNT hybrids can also have superior properties and lower manufacturing cost than physical mixtures of CNTs and Carbon particles. Also, the resulting CNT hybrids can enable higher CNT loadings than is practical for physical mixtures of CNTs and Carbon particles, which can lead to even better properties.

A wide range of carbon-CNT hybrid compositions can be produced via our in-situ synthesis methods. Carbon-CNT hybrids can be made using Carbon particles. In certain examples the carbon particles comprise Natural Graphite, Synthetic Graphite, Graphene, Carbon Black, Activated Carbon, and others. The CNT compositions can be multi-walled, few-walled, double-walled or single-walled CNTs (MWCNT, FWCNT, DWCNT, SWCNT, respectively).

The Carbon-CNT hybrid materials can be used for a wide range of applications, including but not limited to electrode materials for batteries and supercapacitors; conductive and/or reinforcing additives for inks, coatings, polymers, rubbers; air and water purification; catalyst supports; refractories; flame retardants; rheology modifiers; RF shielding; gas and/or energy storage; and others.

The in-situ synthesis methods create carbon-CNT hybrids that address these constraints associated with physical mixtures of CNTs and Carbon particles. Much higher loadings of CNTs can easily be accommodated. The CNTs can fully carpet the surfaces of the Carbon particles. No costly dispersion processing is needed for the CNTs. No compromise of the CNT high aspect ratio is required. The cost of CNT hybrid synthesis can be significantly reduced, which makes the hybrids more affordable in the target applications.

The in-situ synthesis methods use features that result in high-quality carbon-CNT hybrids at large-scale and low-cost. These features include preparation of a well-controlled Catalyst using scalable and low-cost recipes, and achieving well-controlled reaction conditions (e.g., temperature, gas composition, residence time, uniform mixing, etc.) when the Catalyst is contacted with an appropriate Carbon Containing Feed Gas (CCFG) in a commercial-scale reactor.

In one non-limiting example the in-situ synthesis method involves Catalytic Chemical Vapor Deposition (CCVD) using Metal Supported Catalyst, which is a method that is commonly used for commercial-scale production of CNTs. Under the right reaction conditions, when a CCFG comes in contact with the Metal Supported Catalyst, the CCFG decomposes at the Catalytic Metal sites, providing the Carbon atoms for CNT growth (via crystallization). The Catalyst Support for commercial-scale production of CNTs is typically comprised of Metal Oxide particles. Post-synthesis, the Metal Oxide particles are typically removed (via acid digestion) to produce CNTs with sufficiently high purity for applications like energy storage (e.g., battery electrodes). It is significant to note that the total cost of the Metal Oxide particles (which typically represents more than 95% of the total weight of the Catalyst) plus the cost of removing the Metal Oxide particles from the final products (which consumes lots of expensive acid and generates hazardous waste streams that add more cost due to waste treatment and/or disposal) represents a significant percentage of total CNT production cost.

For the CNT hybrids described in this disclosure, Carbon particles are used as the Catalyst Support. Since the Carbon Support is an integral part of the CNT hybrid product, this results in significant cost reductions vs. traditional CNT production using Metal Oxides as the Catalyst Support. For one, the cost of the Catalyst Support is no longer an "extra" cost. Also, the cost of removing the Catalyst Support via acid digestion is eliminated.

However, due to the hydrophobic nature of the Carbon particles, it is challenging to prepare Carbon Supported Catalysts by the traditional method of impregnation of Metal Oxide particles with aqueous Metal Salt solutions. The present disclosure addresses this challenge by incorporating surfactants in the Catalyst recipe, which enables uniform dispersion of the Catalytic Metal on the surface of hydrophobic Carbon particles, even when using aqueous Metal Salt solutions. Uniform dispersion of small Metal Catalyst sites can help to achieve selective synthesis of CNTs vs. other (non-CNT) forms of Carbon (e.g., Carbon Nanofibers) that can grow if the Metal Catalyst sites are too large.

The disclosed methods also result in complete removal of the surfactants from the Catalyst surface without any extra processing steps and without compromising the Carbon particles. This can be accomplished via pyrolysis of the surfactants during the normal heating of the Catalyst particles in the reactor just prior to in-situ CNT synthesis. Surfactant removal prior to in-situ synthesis helps to avoid contamination of the Metal Catalyst sites. Also, since the surfactant is removed via pyrolysis, the Carbon particles are not damaged (e.g., oxidized) during surfactant removal. This is helpful since the Carbon particles are an integral part of the CNT hybrid product.

The present methods also utilize scalable reactor platforms such as Fluidized Bed Reactors and Rotary Kiln Reactors, which can be run in Batch or Continuous Flow modes. These reactor platforms have been successfully deployed for commercial-scale production of CNTs, which is done today at a scale of a few hundred tonnes per year. The applications for CNT Hybrids, however, may require production scale on the order of 10,000 tonnes per year or more. All examples of CNT Hybrids that have been found in the literature utilize non-scalable reactor platforms (more suited for producing CNT Hybrids at a scale that is less than 0.1 tonne per year). Further, these examples appear to be limited to Natural Graphite or Graphene (exfoliated Natural Graphite) as the Catalyst Support and/or limited to synthesis of larger diameter (lower quality) MWCNT and/or limited to producing CNT carpets that do not sufficiently cover the surface of the Carbon particles to maximize performance.

The present disclosure is distinguished from the "CNT hybrid" prior art at least in part as follows. The Catalyst composition and preparation method enables uniformly dispersed and tiny (nanoscale) Metal catalyst sites to be formed on the surface of the Carbon particles using aqueous solutions of Metal salts containing certain surfactants. The use of scalable reactor platforms that provide precise control of reaction conditions, such as fluidized bed or rotary kiln reactors. The demonstrated ability to create CNT carpets on a wide range of Carbon particles. The demonstrated ability to synthesize a wide range of CNT types (MWCNT thru SWCNT). The demonstrated ability to synthesize smaller diameter CNTs 20 nm), which typically have superior properties than larger diameter CNTs (typically >20 nm and more typically >50 nm). The demonstrated ability to achieve more uniform and more substantial (higher areal density) CNT carpets on the Carbon particles.

The prior art teaches active metal deposition on the carbon support material using organic solvents, electrochemical or chemical vapor deposition (CVD) methods. These are more costly than the present methods, and result in non-uniform and/or large metal catalyst sites that do not enable well-controlled selective synthesis of small diameter CNTs.

The use of certain surfactants with metal salt aqueous solution impregnation leads to several advantages as compared to other impregnation methods from the prior art that are based on organic solvents. These advantages include: Most metallic salts are more soluble in water than in organic solvents. Surfactants can prevent the precipitation of metallic salts. Surfactants can control the formation of metallic nanoparticles having a pre-determined size distribution, improving their deposition on the highly hydrophobic carbon material surface. Surfactants can help keep Carbon particles well dispersed during the impregnation step, making these particles accessible for the active metal adsorption on their surface. Surfactants also help the formation of a homogeneous paste having improved rheology, especially at higher solid content. Surfactants keep the solid particles separated from each other during the drying process. No grinding and sieving operations are required before the Supported Catalyst is added to the reactor for in-situ synthesis.

All examples and features mentioned below can be combined in any technically possible way.

In one aspect, a carbon-carbon nanotube (CNT) hybrid material includes carbon particles and CNTs on the surface of the particles. In some examples the CNT comprises more than about 3.2 weight percent of the hybrid material.

Some examples include one of the above and/or below features, or any combination thereof. In an example the CNT comprises at least about 10 weight percent of the hybrid material. In an example the CNT comprises at least about 12 weight percent of the hybrid material. In an example the CNT comprises at least one of multi-walled, few-walled, double-walled and single-walled CNT. In an example the carbon particles comprise at least one of natural graphite, synthetic graphite, graphene, carbon black, and activated carbon. In an example the CNTs have a length in the range of about 3 microns to about 10 microns, a diameter of from about 10 nm to about 50 nm, and a length to diameter aspect ratio of from about 60 to about 1000.

In another aspect a method of producing a carbon-carbon nanotube (CNT) hybrid material includes providing carbon particles, dispersing a metal catalyst on the surface of the carbon particles using an aqueous metal salt solution, and exposing the catalyzed carbon particles to a carbon-containing gas, to grow carbon nanotubes (CNTs) at catalyst sites.

Some examples include one of the above and/or below features, or any combination thereof. In an example the CNT comprises more than about 3.2 weight percent of the hybrid material. In an example the CNT comprises at least about 10 weight percent of the hybrid material. In an example the CNT comprises at least about 12 weight percent of the hybrid material. In an example the carbon particles comprise at least one of natural graphite, synthetic graphite, graphene, carbon black, and activated carbon.

Some examples include one of the above and/or below features, or any combination thereof. In an example the metal salt solution comprises a surfactant. In an example the surfactant is non-ionic. In an example the surfactant is removed by pyrolysis before CNT growth begins. In an example a fluidized bed reactor or a rotary kiln reactor is used to grow the CNTs. In an example the method is effective to convert graphite flakes to more spheroidized structures. In an example the CNTs have a length in the range of about 3 microns to about 10 microns, a diameter of from about 10 nm to about 50 nm, and a length to diameter aspect ratio of from about 60 to about 1000.

In another aspect a method of producing a carbon-carbon nanotube (CNT) hybrid material includes providing carbon particles, dispersing a metal catalyst on the surface of the carbon particles using an aqueous metal salt and surfactant solution, and exposing the catalyzed carbon particles to a carbon-containing gas, to grow carbon nanotubes (CNTs) at catalyst sites, wherein the CNT comprises more than about 3.2 weight percent of the hybrid material. In an example the surfactant is non-ionic. In an example the surfactant is removed by pyrolysis before CNT growth begins.

DETAILED DESCRIPTION

Figure 1:
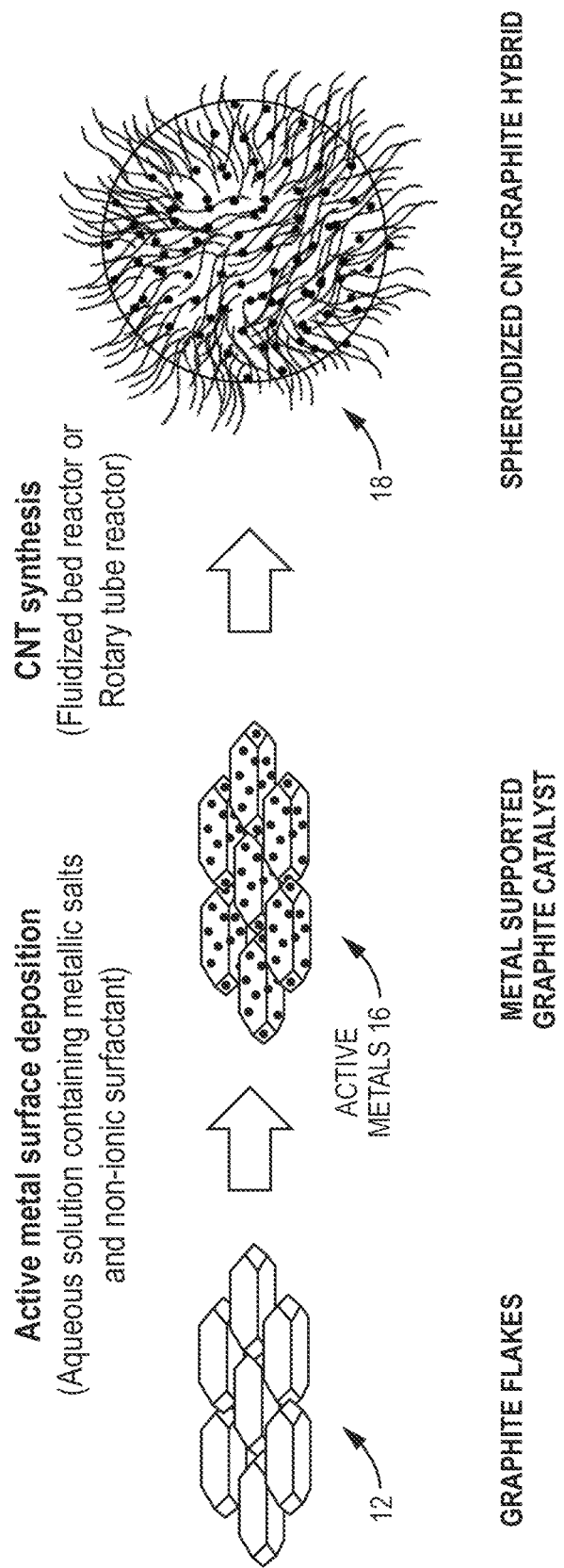
FIG. 1 graphically depicts a graphite-CNT hybrid material and the basic process by which it is produced.

Described herein are carbon-CNT hybrid materials and methods of producing such materials. Aspects of the disclosure relate to catalyst preparation methods, and processes for making CNT-carbon hybrid materials (the materials sometimes termed herein "hairy carbon"). In particular, this disclosure describes novel catalyst preparation methods and synthesis conditions for making uniform CNT-carbon hybrid materials. The CNT-carbon hybrid materials are suitable for applications such as energy storage (lithium ion, lead acid, supercapacitors, electrodes fabrication) high performance tires and rubber products (racing cars, belts, gaskets, construction equipment, trucks), additives for plastics, electrostatic discharge compounds, high performance coatings, and other industrial applications.

One of the main challenges in the preparation of heterogeneous catalysts using hydrophobic supports, such as carbon materials having differences in morphology, specific surface area and porosity, is the fine control of the active metal deposition and dispersion on the carbon surface during the catalyst impregnation and drying steps. The low wettability and the weak interaction between metallic ions and the carbon surface means that the deposition of the active metals takes place in a non-uniform and not-well controlled manner. These are some of the reasons why most of the works published in the literature employ organic solvents, such as polyethylene glycol, ethanol, isopropyl alcohol, and the like, to increase solid wettability, instead of using aqueous metallic solutions. Other prior-art metal deposition methods include chemical vapor deposition of iron pentacarbonyl in gas phase or ferrocene in aerosol form and electrochemical deposition of metals on carbon electrodes. This disclosure, in contrast with the prior art, enables the production of different types of CNTs, such as Single Walled CNTs, Few Walled CNTs and Multi Walled CNTs-Carbon hybrid materials. In the prior art, CNT-graphite materials having large diameter MWCNTs (>60 nm diameter) and carbon fibers materials and low surface coverage have been reported.

The use of organic solvents as in the prior art leads to a series of disadvantages when the catalyst is produced at large scale. For instance, some metallic salts have limited solubility in these solvents. Also, even though the surface wettability improves when organic solvents are used, the metals still show weak interaction with the surface. Therefore, there is not good control of the active metal deposition. Most of the active metals are preferentially deposited at edges, intercalated between the lamellar sheets of the graphite, and fewer metallic atoms are deposited on the basal plane surface. Agglomerations of the active metals lead to an increase in their cluster particle sizes, which leads to large diameter MWCNT and the formation of carbon fibers. The reaction becomes less selective, thus carbon nanotube diameter is highly dependent on the metal cluster size. Further, organic solvents are volatile, flammable, and hazardous materials, thus special equipment for operation and safety are required. Finally, the high price of organic solvents negatively impacts the catalyst production cost.

These technical limitations were resolved herein by use of surface modification agents (so-called surfactants) along with metal aqueous solutions to improve the solid wettability properties and the control of the metal adsorption and dispersibility on the carbon particle surface. These surface modification agents, through interaction between their hydrophobic tail and the carbon surface, form ad-micelles that change the surface roughness and hydrophilicity properties of the carbon substrate. The active metals are uniformly deposited on the exposed hydrophilic surface of the ad-micelles. They can also be located surrounding the outer surface of the surfactant micelles formed in solution. The metal-surfactant micelles can be deposited on the carbon surface during the impregnation and drying process. In this case, the metal particle size will depend on the amount of active metal surrounding the micelle, the type of micelle, and their sizes and aggregation number.

In some examples, for the synthesis of CNT-carbon hybrid materials, an aqueous solution containing soluble metallic salts of cobalt, nickel, iron or molybdenum (nitrates, acetates, ammonium or citrates salts), and a non-ionic surfactant (Triton X-100 "Polyethylene glycol p-(1,1,3,3-tetramethylbutyl)-phenyl ether" (available from Sigma-Aldrich Corp., St. Louis, Missouri, US), alcohol ethoxylates, poly-ethylene glycol and poly-propylene glycol and mixtures of them (e.g., Pluronic p123 (also available from Sigma-Aldrich Corp) and the like) can be employed. The total amount of metals depends on the maximum content permitted according to the specific application.

The CNT-carbon hybrid materials are developed by growing carbon nanotubes on conventional carbon substrates such as: graphite powder, carbon black, graphene, carbon fibers and glassy carbon. A catalyst is used to initiate CNT growth in the presence of a carbon source (ethylene, acetylene, methane, carbon monoxide, etc.). The reaction can take place using the Catalytic Chemical Vapor Deposition (CCVD) method in a fluidized bed, moving bed, or a rotary kiln reactor at temperatures between 300-1000° C. The catalyst active metals consist of a combination of transition elements of the groups VIII and/or VIB of the periodic table. The catalyst support is based on graphite, graphene, carbon black or activated carbon. The catalyst preparation consists of impregnating the catalyst support in the presence of an aqueous solution containing the above metals and surfactant agents. The type of surfactants employed are mainly non-ionic, however other types of surfactants, such as zwitterionic, catanionic or amphoteric surfactants, can be used. This catalyst preparation method provides high density CNT surface coverage, where the CNTs comprise long tubes and narrow diameter distribution, as a result of a better control of the metal deposition on the carbon support particles. The type of carbon nanotubes synthesized depends on the type of active metal, the carbon source employed, and the reaction temperature. The MWCNT-Graphite hybrid material obtained delivers superior battery performance when this material is employed as an electrode versus conventional carbon materials in Li-ion and lead acid batteries, supercapacitors, etc.

FIG. 1 graphically depicts a graphite-CNT hybrid material 18 and the basic process 10 by which it can be produced. The same basic process steps can be used to produce hybrid materials from carbons other than graphite, as described elsewhere herein. The starting carbon material 12 (which in this non-limiting example is graphite flakes) is mixed with an aqueous solution containing metallic salts (of the catalyst metal(s)) and an appropriate surfactant. Active metals 16 are then present on the carbon surface. CNTs are then synthesized using the catalyst. When the process involves graphite flakes, the flakes can be spheroidized by the CNT growth, creating a spherical graphite-CNT hybrid material 18 in which the surface of the carbon is covered with CNT. Additional details of exemplary processes are described herein.

Figure 2:
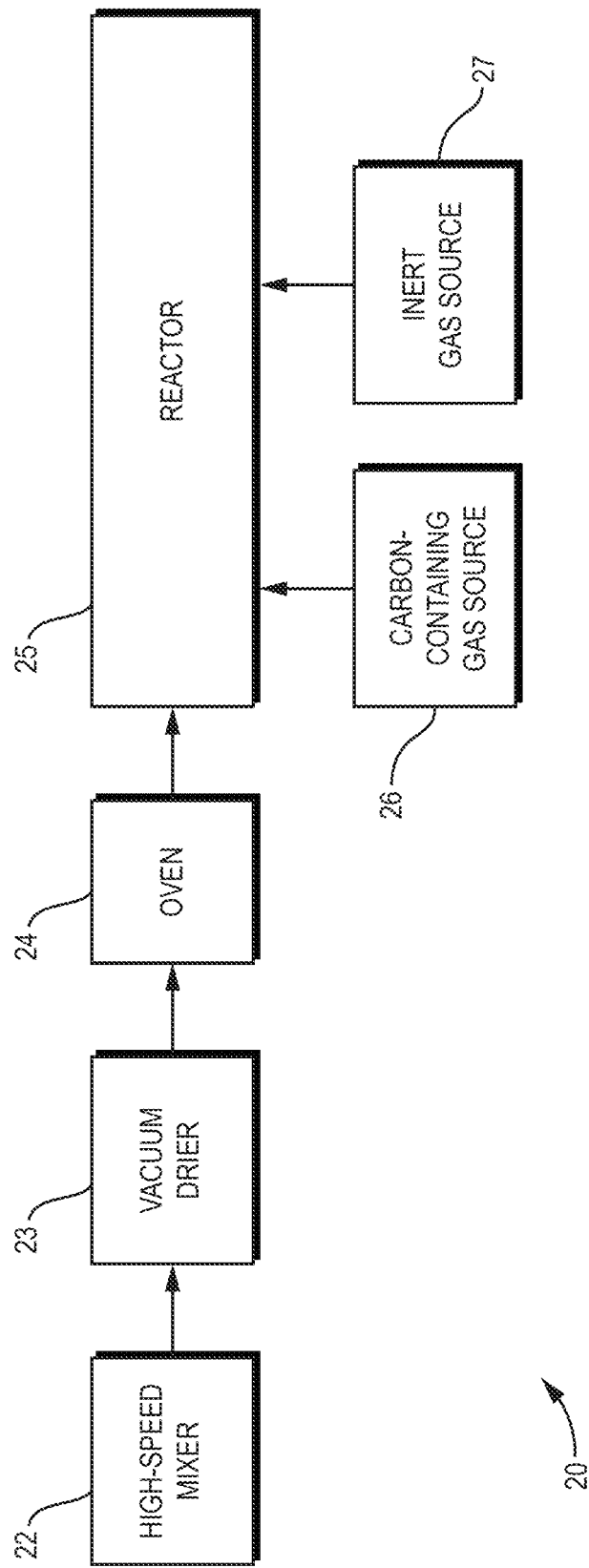
FIG. 2 is a block diagram of a system that can be used to produce the carbon-CNT hybrid materials.
Figure 3:
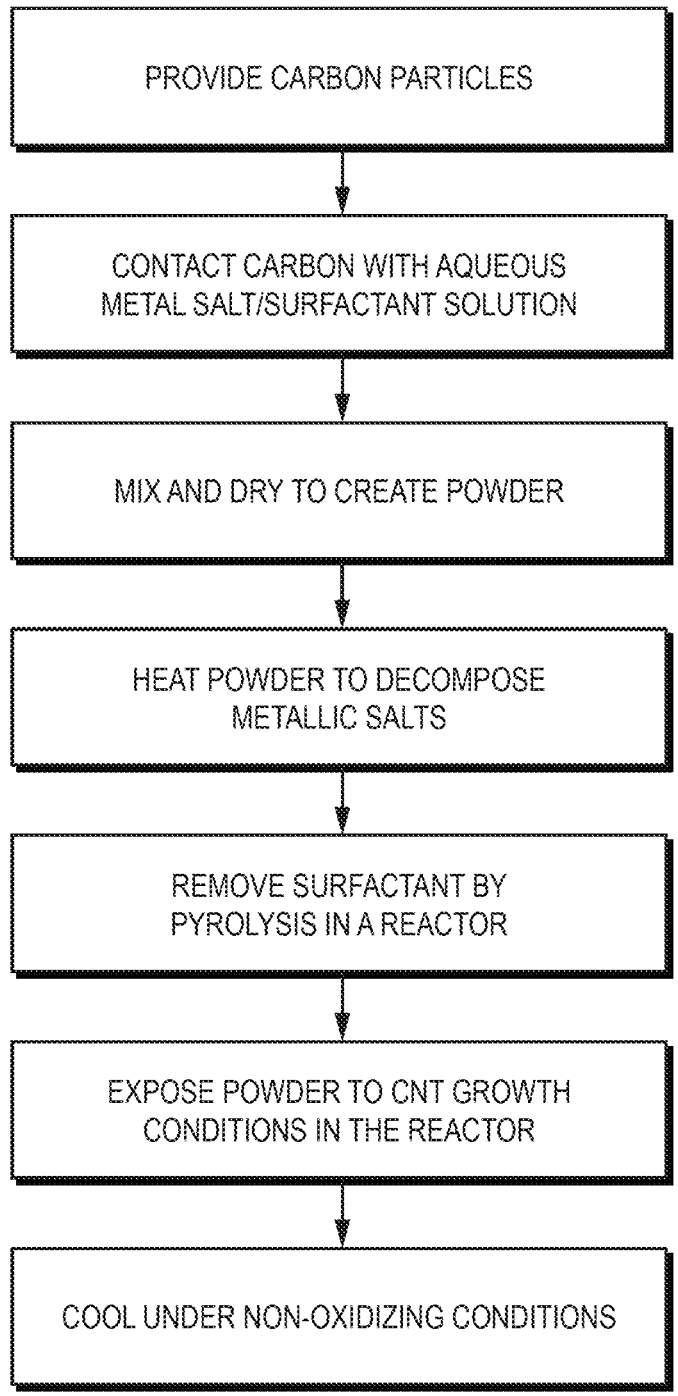
FIG. 3 illustrates steps in a process for producing carbon-CNT hybrid materials.

FIG. 2 is a block diagram of a system 20 that can be used to produce the carbon-CNT hybrid materials, and FIG. 3 provides steps of a method 30 for producing the carbon-CNT hybrid materials using system 20. High-speed mixer 22 can be used to contact the carbon powder or flakes with an aqueous solution containing metallic salts and a surfactant. In some examples a paste is formed in the mixer, and the material is kept under controlled moisture and temperature for a desired contact time. The sample is then dried, for example using vacuum drier 23, which leaves a fine powder. The metallic salts are then decomposed in oven 24, which typically operates at less than 200° C. This forms a metal oxide catalyst precursor on the surface of the carbon particles. The sample is then placed into reactor 25. In some examples reactor 25 is a fluidized bed reactor or a rotary kiln reactor, although other reactors can be used. The surfactant is removed by pyrolysis (under inert gas flow from source 27) at moderate temperature. The pyrolysis can be performed during normal heat-up of the sample. The carbon-catalyst is then exposed to CNT growth conditions in reactor 25, using carbon-containing gas source 26. When CNT growth is complete the sample is cooled down under non-oxidizing conditions, which can be assisted with inert gas source 27. Additional details of certain processes are set forth below.

In some examples the carbon-CNT hybrid material includes carbon particles and more than about 3.2 weight percent CNTs on the surface of the particles. In an example the carbon particles comprise at least one of natural graphite, synthetic graphite, graphene, carbon black, and activated carbon. In an example the CNT comprises at least about 10 weight percent of the hybrid material. In another example the CNT comprises at least about 12 weight percent of the hybrid material. The CNT can take any form and in some examples includes at least one of multi-walled, few-walled, double-walled and single-walled CNT. In some examples the CNTs have a length in the range of about 3 microns to about 10 microns. In some examples the CNTs have a diameter of from about 10 nm to about 50 nm. In some examples the CNTs have a length to diameter aspect ratio of from about 60 to about 1000.

In some examples the metal salt solution comprises a surfactant. In an example the surfactant is non-ionic. In some examples the surfactant is removed by pyrolysis before CNT growth begins. In some examples a fluidized bed reactor or a rotary kiln reactor is used to grow the CNTs.

In an example the method is effective to convert graphite flakes to more spheroidized structures.

In examples described herein the metal oxide composition in the catalyst varies in the 2 to 7 wt. % range, as determined by ash method and TGA analysis. Typical values are in the 3.5 to 5.5 wt. % range. In an example the Co(Ni)/Fe or Co+Ni/Fe atomic ratio is about 1:2. In examples the graphite catalyst support purity is ≥96.0 wt. %, with typical values at ≥99.0 wt. %, and most preferably ≥99.5 wt. %. After metal deposition, the surface area of the catalyst does not change significantly with respect to the value obtained for the graphite support.

In some examples the surfactant concentration varies from about 0.1 to about 5.0 wt. %, while typical values are in the 0.5-2.0 wt. % range, most preferably in the 0.5-1.0 wt. % range. Surfactant removal takes place in an inert atmosphere, typically under a nitrogen flow in the fluidized bed or rotary tube reactor, at least at the surfactant decomposition temperature. In the case of the Triton X-100 surfactant this temperature is about 300° C.

In some examples the metallic salt decomposition takes place under air flow in an oven in two consecutive steps; 60° C. for about 2 hours and then 180° C. for about 2 hours.

To grow MWCNT there is a catalyst particle size that is in the range of about 10 to about 15 nm, as determined by SEM. In the case of Pt supported on carbon black it is possible to determine the catalyst particle size and dispersion using chemisorption techniques and electron microscopy. The Pt/carbon black is reduced to metal and this is the active and stable phase during the reaction. In the case of CNT, the oxide precursor is activated by a reduction-carbidation reaction to form metal clusters of supported metal carbide aggregates, followed quickly by CNT growth. A method employed for determining active phase particle size in CNT is by observation by TEM of the metal particles attached to tubes.

In some examples the reactor process conditions depend on the type of carbon source and CNTs to be synthesized. In an example of MWCNT synthesis using ethylene, reaction temperatures vary over the 600 to 800 C range, typically between 650 C to 730 C. For SWCNT production from CO, reaction temperatures vary in the 650-800 C range, while typical values are in the 680-760 C range. For FWCNT synthesis from methane, the reaction temperature varies in the 900-1000 C range, while typical values are in the 950-975 C range.

Depending on the type of CNT to be synthesized, the gas composition varies. In an example for MWCNT, a C2H4/H2 ratio of 100/0-70/30 V/V % is used, with a typical composition of 70/30-80/20 V/V %. N2 composition can vary from 0 to 40 V %, while typical values are in the 20-35 V % range. In an example for SWCNT, the CO/inert gas (e.g., N2, Ar) ratio is from 100/0 V/V % to 60/40 V %, with typical values at 100/0-80/20 v/v %. In an example for FWCNT, the CH4/H2 ratio is in the 30/70 V/V %-10/90 v/v % range, with typical values of 15/85-25/75 v/v %.

In the resulting carbon-CNT hybrid materials, most of the CNTs have been observed by SEM to grow following a base mode mechanism, wherein the CNT is bound to the substrate.

In an example a high purity graphite (about 99.8% wt. Carbon content) having an average size of about 20 μm was contacted with a solution containing 0.042 g/cc cobalt acetate, 0.137 g/ml iron nitrate and 0.01 g/ml of the Triton X-100 surfactant. By using a typical industrial high-speed mixer, a thin paste was obtained and then this remained for about 12 h under controlled moisture and temperature conditions before drying. The drying of the material was carried out under vacuum and at 77° K in a freeze-drying equipment or under vacuum at T≥60° C. using a rotavapor equipment. Drying can also be carried out using a double cone tumbling dryer machine. A sample of the resulting graphite-catalyst powder was loaded into a fluidized bed reactor. The surfactant, acetate and nitrates salts were removed by decomposition during the reactor heating-up from room temperature under $N_2$ flow to 675° C. Subsequently, a mixture of 80% V ethylene in 20% of a mix of 5% $H_2$ in Ar (total gas flow 2 l/min) was introduced into the reactor to grow CNT. The system remained under the same conditions for about 30 minutes. The reactor was cooled down under $N_2$ flow (2 l/min) to room temperature. A dense carpet of MWCNT of about 0.38μ thickness, 10-20 nm diameter and about 5 to10μ length is formed on the graphite surface. The graphite particles are completely covered by the CNTs. Thermogravimetric analysis (TGA) illustrate an estimated amount of MWCNT in the hybrid material is about 12 wt. %, and the residual metal oxide is below 1 wt. %.

When this same graphite catalyst was prepared following the same procedure but without the surfactant, a low density MWCNT carpet and partial particle coverage are present, with most of the CNT grown in the edge plane and fewer in the basal plane of the graphite particles. TGA analysis establish lower MWCNT production without surfactant.

The hybrid material was used in the fabrication of Li-ion anode. Battery performance tests were conducted at different temperatures. The hybrid material had a greater energy capacity at different discharge rate capability at various temperatures. For example at C/5 and 22° C., at a discharge rate of 5 the graphite-CNT hybrid material had about one and one-half times greater percentage of full capacity (about 90% vs. about 60% for graphite). In another example at 0° C. and a discharge rate of 1 the graphite-CNT hybrid material had about 40% greater percentage of full capacity (about 85% vs. about 60% for graphite). In another example at −30° C. graphite had zero capacity while the graphite-CNT hybrid material had over 50% percentage of full capacity at a discharge capacity of about 0.2.

In another example a graphite material having an approximate 5μ average particle size was used as a catalyst support. The catalyst was prepared using the same procedure as described above. CNT synthesis was conducted in a rotary tube reactor. About 1 gram of catalyst was contacted with a 2 l/min of a gas flow of ethylene-H2 mixture (75% V ethylene) at 675 C for 3 minutes and for 30 minutes reaction time. SEM images of the hybrid materials obtained at 3 minutes and 30 minutes reaction times show a high density CNT carpet in both samples. This carbon carpet density is higher than in the hybrid material synthesized with 20μ graphite particle size catalyst. The hybrid material particles show a spherical shape, even though the starting graphite particles are not uniform. It is believed that the graphite is made more spherical during the CNT growth process. The relative proportion CNT/graphite ratio composition increases when the reaction time increases.

When decreasing the graphite particle sizes from 20μ to 5μ, the surface area and pore volume increase by a factor of about 3 and 1.8, respectively. Both surface area and pore volume increase when MWCNTs grow on the graphite surface. This increase is more important when using small sizes of graphite particles. For 3 minutes reaction time, an important increase of surface area (361% increase) and pore volume (122%) and a significant amount of MWCNT deposited on the graphite surface (~22 wt. %) is observed.

In an example CNT-graphite hybrid materials are synthesized from two different graphite materials. The differences are in mean particle size. When using 5-micron particle size graphite, the surface area and pore volume increases. The active metal surface dispersion increases because the surface area is higher. Therefore, higher CNT coverage is produced. TGA analysis of CNT-graphite hybrid materials obtained in a rotary tube reactor using graphite having a particle size of about 5 microns at 3 and 10 minutes reaction time, respectively, establish that the CNT content increases dramatically with reaction time.

When this catalyst was loaded into a fluidized bed reactor and the synthesis conditions described above were used (graphite having a particle size of about 5 microns and a 10 minute reaction time), a TGA analysis established that this reactor produced a similar material, which demonstrates the flexibility of the production processes that can be used herein.

In an example, the CoFe surfactant solution described above was contacted with a conducting carbon black substrate. In this case 5 grams of the carbon catalyst support was impregnated using an excess of solution (1 gram solid/10 ml solution) at 55° C. for 2 h, and then the solvent was removed from the solid by using freeze-drying equipment. The dry powder obtained was loaded into a rotary kiln reactor, and then a $N_2$ gas flow was introduced to remove the air from the system. The system was heated up to 675° C. under $N_2$ flow, and then a flow of ethylene (1.5 L/min) was introduced into the reactor. The system remained under the same conditions for about 30 minutes. The reactor was cooled down under $N_2$ flow (2 l/min) to room temperature. An SEM analysis corresponding to the starting carbon black material and an SEM of the resulting carbon black-CNT hybrid material establishes that the carbon black is composed of chains of elementary spherical particles having diameters between 30 and 60 nm and grain sizes in the 5 to 20μ range. When starting the CNT growth, the chains of spherical carbon begin to separate from each other and a carpet of MWCNT having diameter between 10-20 nm is formed.

In an example, a CoFe supported on activated carbon was prepared following the same procedure as described above. This catalyst support shows a BET surface area and pore volume of about 1649 $m^2/g$ and 0.91 cc/g, respectively, and a maximum rate of oxidation at 620° C. About 60% of the pores have diameter smaller than 2 nm. This represents a micropore area of about 1000 $m^2/g$ (0.54 cc/pore volume). The outer diameter of MWCNTs is about 10 to 20 nm. The MWCNT growth occurs in the external surface area of the carbon particles. This is evidenced by an SEM image that clearly illustrates the MWCNT formation on the external surface of the carbon particles.

In an example, the 5μ graphite material was contacted with a solution containing cobalt nitrate, ammonium heptamolybdate (Mo:Co molar ratio 1:1 and 2:0) and 0.5 wt. % Triton X-100 surfactant aqueous solution. A smooth paste was formed after mixing in a high-speed mixer apparatus. After a 6-hour aging, the solid was dried using freeze-drying equipment. The SWCNT synthesis was conducted using a rotary kiln reactor. The catalyst was activated by reduction of the metals under H2 flow at 550° C. for 30 minutes. After the activation step, the temperature in the reactor was raised to 700° C. under nitrogen flow and then a flow of CO was introduced for the SWCNT synthesis for 30 minutes. SEM images show bundles of SWCNT having 2 to 9 nm diameter. Thermogravimetric analysis shows graphite and SWCNT-graphite hybrid material. The appearance of a second signal at around 550° C. is attributed to the presence of CNTs. Near Infrared Fluorescence (NIRF) analysis was conducted in order to confirm the presence of SWCNTs in the hybrid material, as suggested by the SEM, TGA and optical absorption spectra. The results showed high-intensive emission peaks in the 8,000 to 11,000 $cm^{-1}$ optical frequency range when using 532 nm, 638 nm, 671 nm, and 785 nm lasers. The integration of the combined signals showed that the hybrid material mainly contains (6,5), (7,5), (9,4) and (8,3) semiconducting SWCNTs in the 41%, 17%, 15% and 13% proportions, respectively.

Several examples follow:

Example 1

Comparison of Catalyst Preparation Method of Prior Art Vs the Present Disclosure Prior Art: Catalyst preparation and CNT-graphite material synthesis conditions:

About 2.4 grams of natural graphite with an average size of about 25 μm was dispersed in 50 ml of alcohol and nickel nitrate aqueous solution was added dropwise. Carbon and Nickel composition was set at 400:1 to 100:1 molar ratio. The solution was then heated under vigorous magnetic stirring until the solvents were completely evaporated. The sample was further dried at 110° C. under vacuum for 10 h to remove traces of water. The nickel supported graphite catalyst was spread out into a quartz boat and then transferred to the right side of a tube furnace. Another boat filled with 2 g of the carbon source (2,3 dipicolinic acid ($C_7H_5NO_4$) was put at the left zone of the furnace. The system was heated under 5% $H_2$ in Ar flow to 900° C. for 4 h. After cooling down, to room temperature, the resulting CNT decorated graphite was treated with 10% $HNO_3$ for 2 h to remove trace Ni nanoparticles dispersed on the graphite surface and then dried at 110° C. for 10 h under vacuum.

Figure 4:
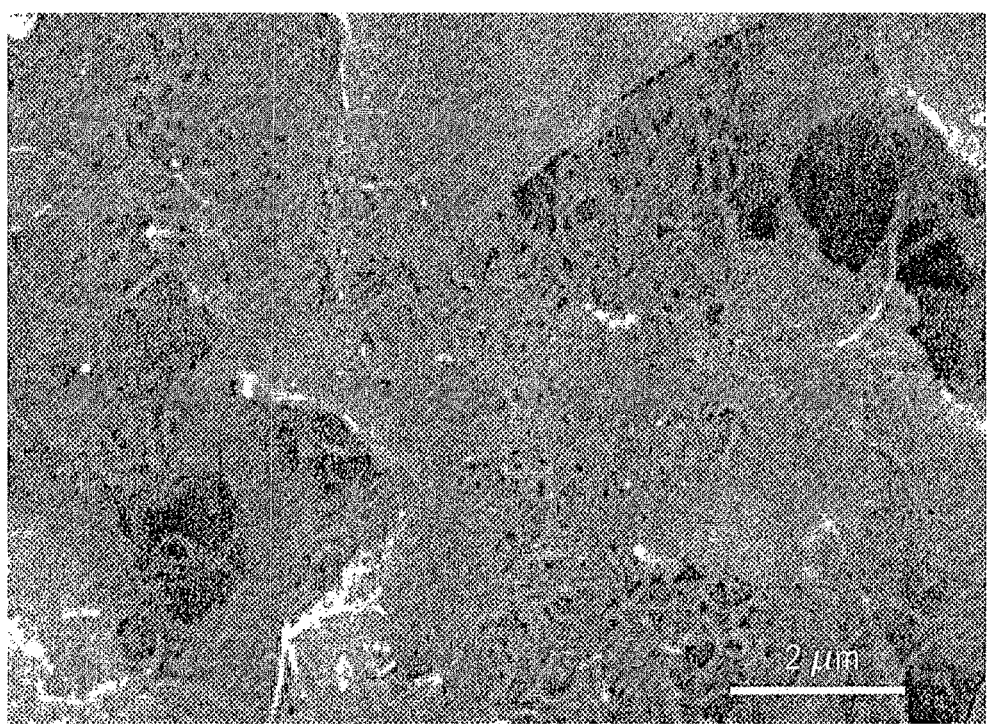
FIG. 4 is a prior-art SEM image corresponding to a carbon nanotube-graphite hybrid material.

FIG. 4 (prior art, taken from: "Hairy Graphite of High Electrochemical Performance Prepared Through In-Situ Decoration of Carbon Nanotubes", Huiyuan Zheng, Guobin Zhu, Qunting Qu, Siming Yang, Honghe Zheng., Electrochimica Acta 233 (2017) 229-236) shows an SEM image corresponding to hairy graphite (HG) material obtained under the best catalyst formulation (200:1 C/Ni molar ratio). MWCNT having about 60-80 nm diameter were observed and some tubes show about 10μ length. There are zones in the graphite material that are not completely covered by the CNTs and some amorphous carbon was seen on the surface. The estimated amount of MWCNT in the sample was about 3.2 wt. %.

Zhao et al. ("Carbon Nanotube growth in the pores of expanded graphite by chemical vapor deposition", J. Zhao, Q. Guo, J. Shi, L. Liu, J. Jia, Y. Liu, H. Hang., Carbon 47 (2009) 1747-1751) investigated the carbon nanotube growth in the pores of expanded graphite by CCVD method. The researchers impregnated expanded graphite particles with metallic aqueous solutions containing Co, Fe or Ni nitrates. The optimum catalyst formulation was obtained for 0.025 Molar/L Co solution concentration. The MWCNT synthesis was carried out in a boat reactor using acetylene as a carbon source, at 850° C. for 30 minutes. MWCNT show average diameter of about 70 nm. Partial CNT carpet coverage of graphite particles was observed. The hairy graphite composite showed an improved tensile strength property (15.2 MPa CNTs/flexible graphite vs 10 MPa for flexible graphite).

Tour et al. ("Graphene-Carbon Nanotube Hybrid Materials and Use as Electrodes" J. M. Tour, Y. Zhu, L. Li, Z. Yan, J. Lin., U.S. Pat. No. 9,455,094 B2, September 27 (2016)) described a method for making graphene-carbon nanotubes hybrid material and its use as electrodes for super capacitors. The catalyst preparation consists of the following steps: i) associating a graphene film with a substrate (copper foil), ii) applying a catalyst based on Fe supported on alumina and a carbon source to the graphene film, and iii) growing CNT on the graphene film. Both metal and alumina support deposition into the graphene film is carried out using an electron beam method. The carbon source is methane, ethane, or ethylene. Ultra-short SWCNT or MWCNT tubes are obtained at reaction temperatures between 550-1100° C.

Takeuchi et al. ("Carbon Electrode for a Nonaqueous Secondary ElectroChemical Cell", E. S. Takeuchi; R. A. Leising, U.S. Pat. No. 5,443,929, Aug. 22, 1995) disclosed a method for producing electrodes based on carbon filaments (carbon fibers) supported on conventional carbon substrates (carbon black, graphite, carbon fibers and glassy carbon). The carbon filaments have a diameter between 50 and 200 nm. The catalyst contains a combination of cobalt oxide and iron complexes, such as ferrocene and/or iron pentacarbonyl. The Carbon-Carbon fiber hybrid material is said to be suitable for the fabrication of rechargeable alkali metal electrochemical-cell anodes.

Present Disclosure:

About 40 grams of high purity graphite (99.8% wt. Carbon content) having an average size of about 20 μm was contacted with 30 ml of a solution containing 0.042 g/cc cobalt acetate, 0.137 g/ml iron nitrate and 0.01 g/ml of the Triton X-100 surfactant. By using a typical industrial high-speed mixer, a thin paste was obtained and then this remained for about 12 h under controlled moisture and temperature condition before drying. The drying of the material was carried out under vacuum and at 77° K in a freeze-drying equipment or under vacuum at T≥60° C. using a rotavapor equipment. Drying can also be carried out using a double cone tumbling dryer machine.

About 20 grams of the resulting graphite-catalyst powder was loaded into a fluidized bed reactor. The surfactant, acetate and nitrates salts were removed by decomposition during the reactor heating-up from room temperature under $N_2$ flow to 675° C. Subsequently, a mixture of 80% V ethylene in 20% of a mix of 5% $H_2$ in Ar (total gas flow 2 l/min) was introduced into the reactor and then the system remained under the same conditions for about 30 minutes. The reactor was cooled down under $N_2$ flow (2 l/min) to room temperature.

Figure 5A:
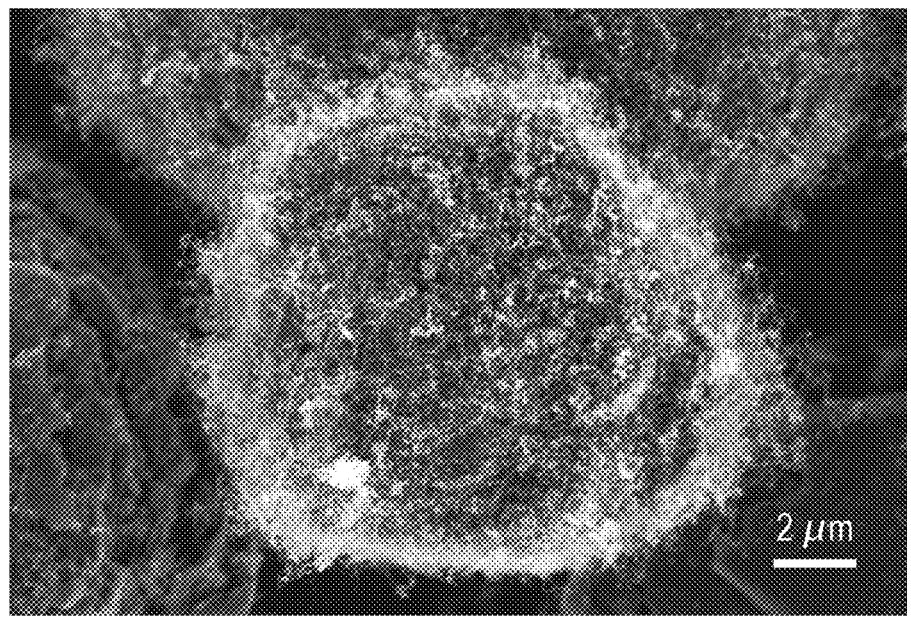
FIG. 5A is an SEM image corresponding to a carbon nanotube-graphite hybrid material of the present disclosure, at low magnification.
Figure 5B:
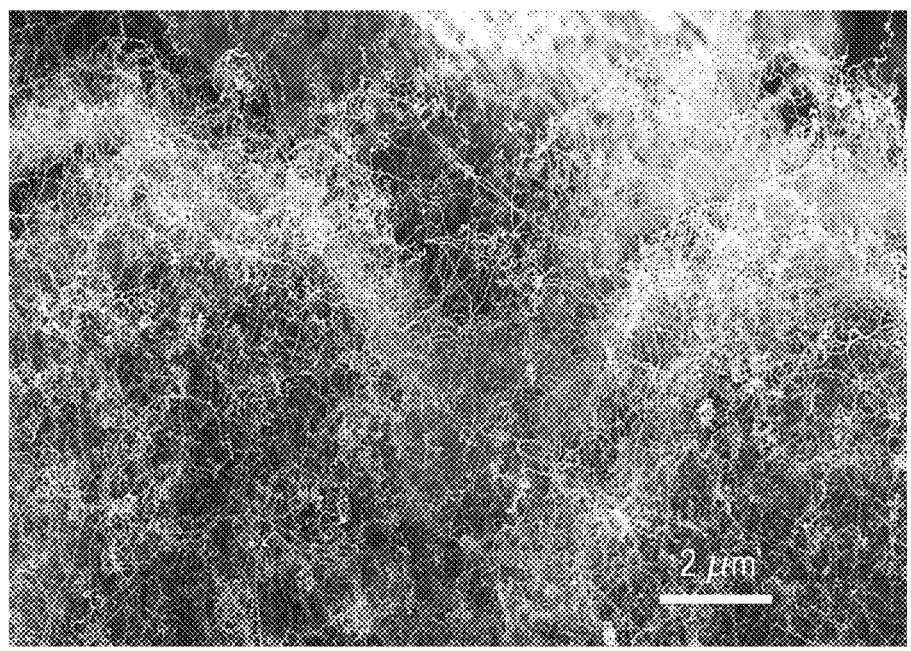
FIG. 5B is an SEM image corresponding to a carbon nanotube-graphite hybrid material of the present disclosure, at high magnification.
Figure 6:
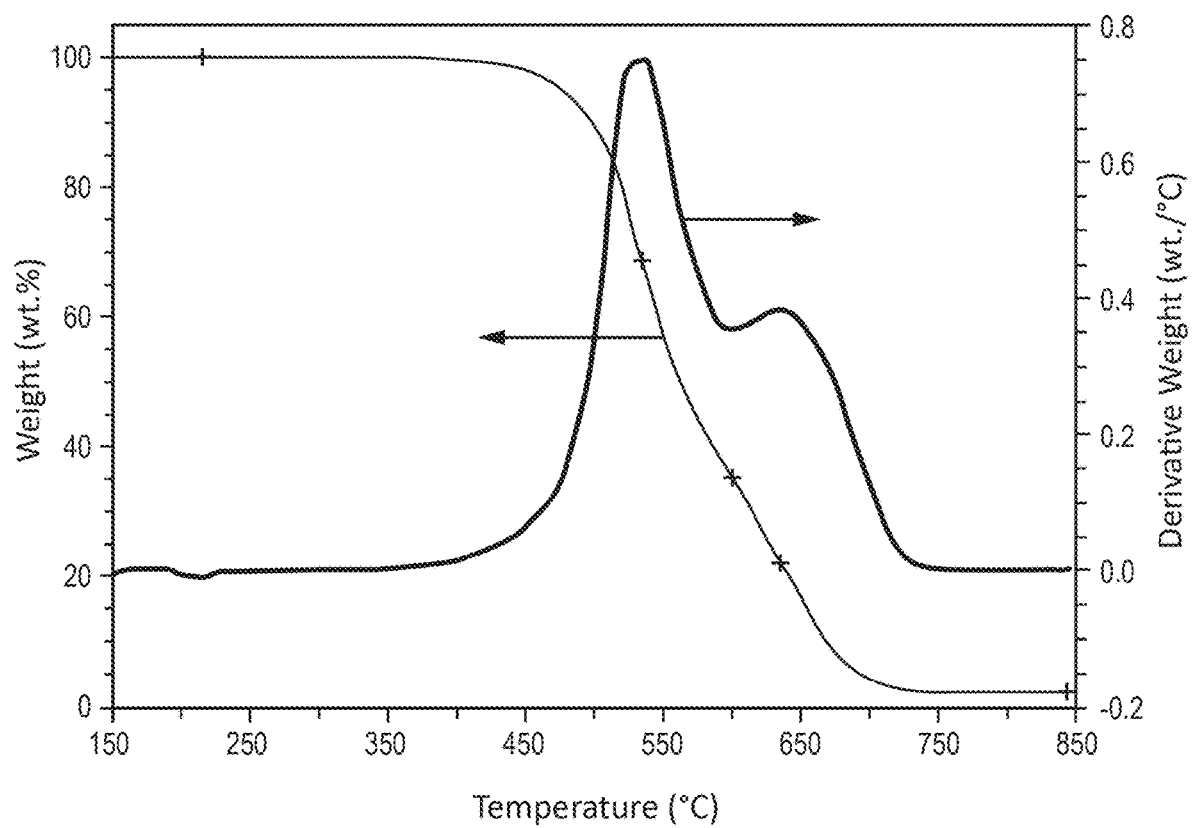
FIG. 6 is a thermogravimetric analysis of a carbon nanotube graphite hybrid material of the present disclosure, wherein signals at about 550° C. and 650° C. correspond to CNT and graphite, respectively. In all of the gravimetric analyses herein the plot lines are associated with the correct axes using an arrow pointing to the axis.

FIGS. 5A and 5B show SEM images corresponding to HG material obtained by this process, taken at 4,000× and 7,000×, respectively. A dense carpet of MWCNT of about 0.38μ thickness, 10-20 nm diameter (vs 60-80 nm in the prior art) and about 5 to10μ length is formed on the graphite surface. The graphite particles are completely covered by the CNTs. Thermogravimetric analysis (TGA) shown in FIG. 6 clearly show two signals very well differentiated from each other that correspond to MWCNT and graphite, respectively. The estimated amount of MWCNT in the HG material is about 12 wt. % (vs 3.2 wt. % in the prior art) and the residual metal oxide is below 1 wt. %.

Example 2

Comparison Between Catalyst Preparation With and Without Surfactant

Figure 7A:
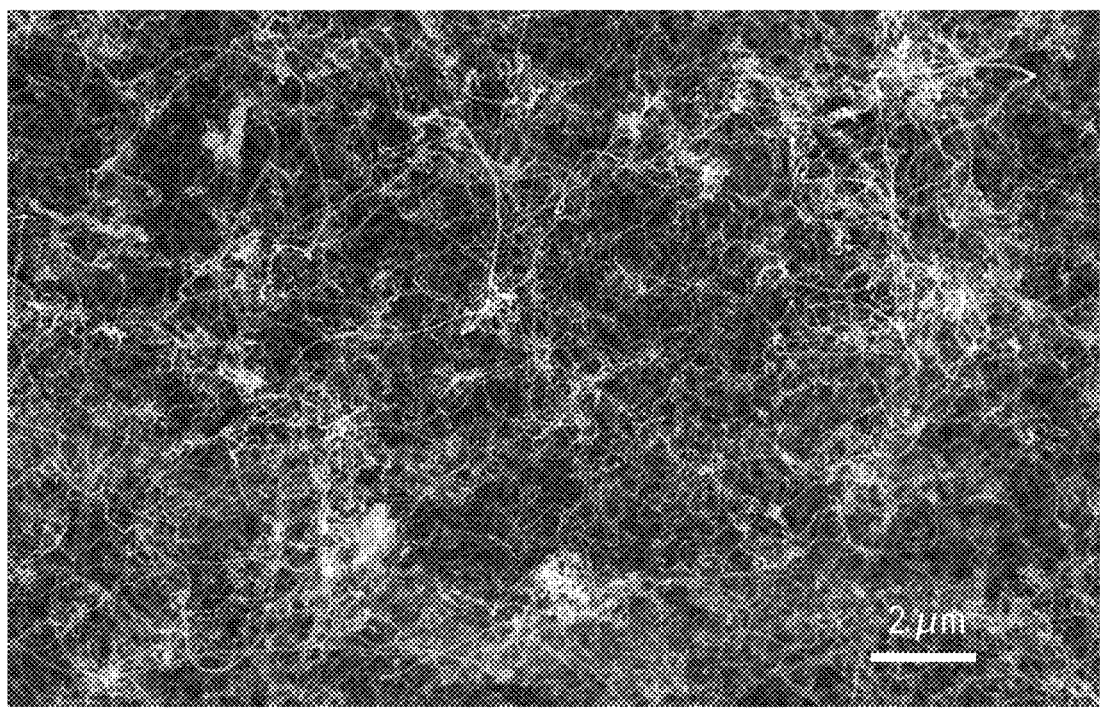
FIG. 7A is an SEM image of a carbon nanotube-graphite hybrid material obtained when the catalyst is prepared with a surfactant solution.
Figure 7B:
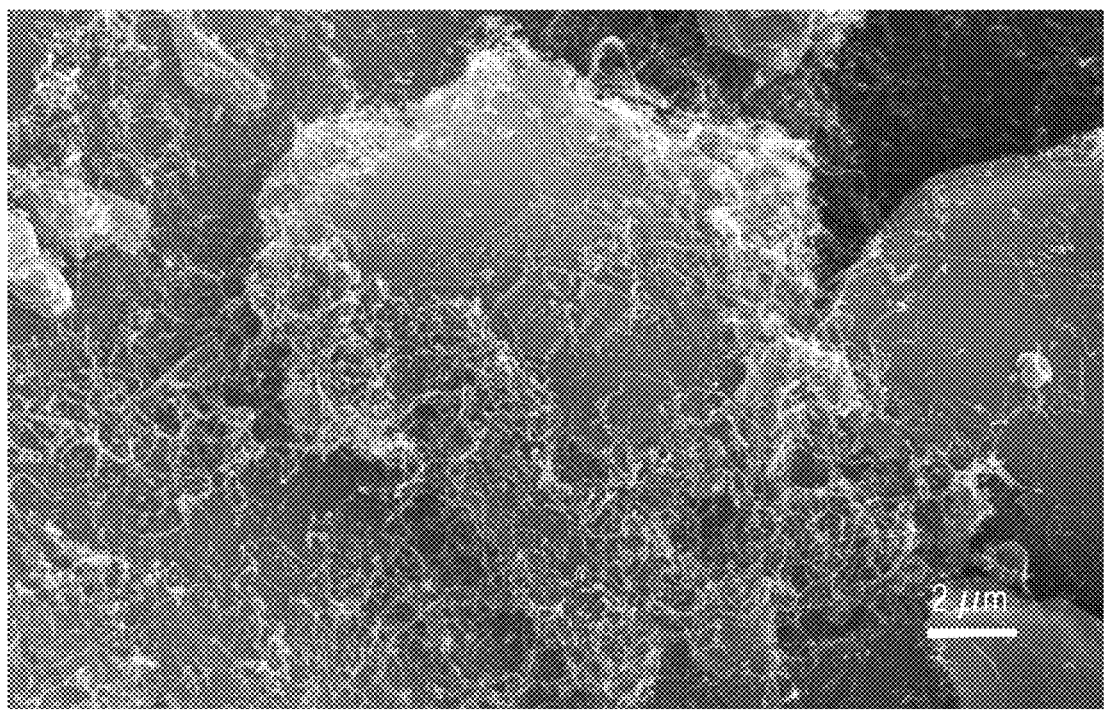
FIG. 7B is an SEM image of a carbon nanotube-graphite hybrid material obtained when the catalyst is prepared without a surfactant solution.
Figure 8:
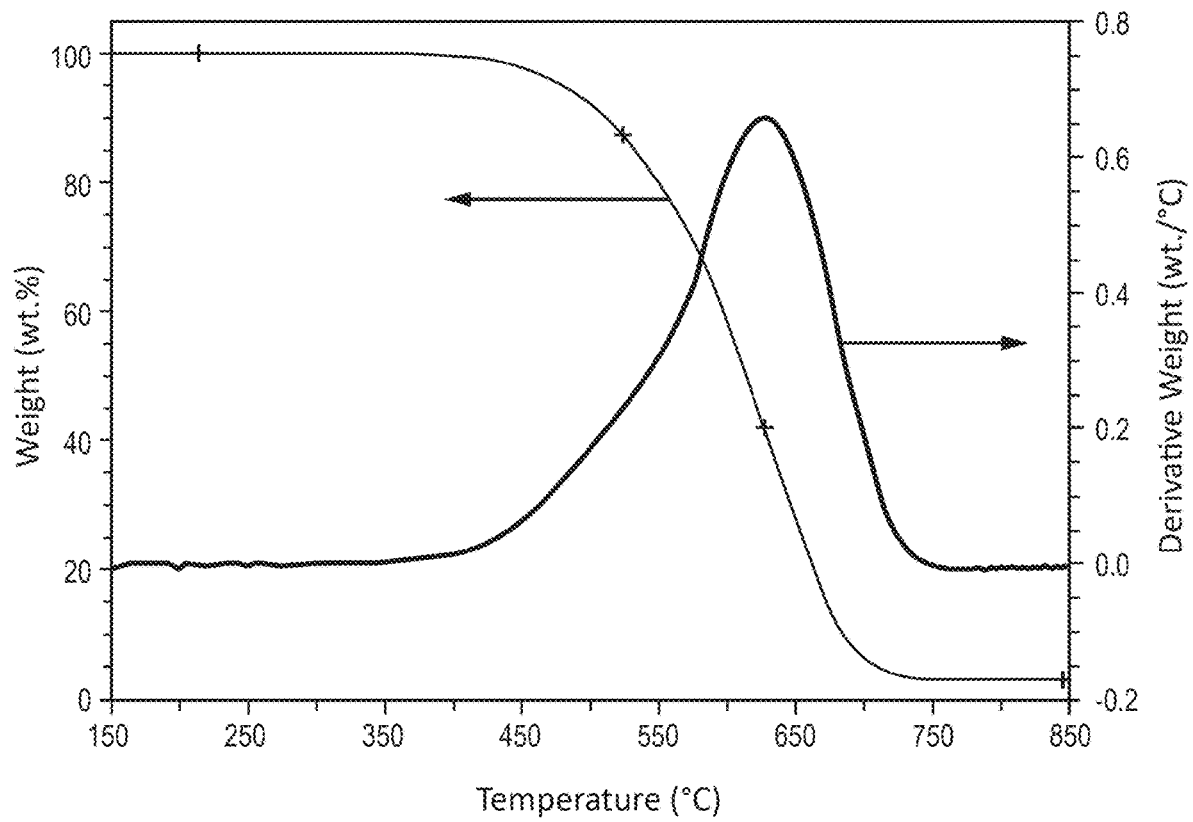
FIG. 8 is a thermogravimetric analysis of a carbon nanotube graphite hybrid material obtained when the catalyst is prepared without a surfactant solution.

A second Co—Fe/graphite catalyst was prepared following the same procedure as described in Example 1, but in this case no Triton X-100 surfactant was used. SEM images of FIGS. 7A and 7B, show a comparison between the hairy graphite (HG) materials obtained when preparing the catalysts with surfactant vs without surfactant in the metallic solution, respectively. FIG. 7A shows CNT essentially covering the graphite when surfactant is used. In contrast, in FIG. 7B a low density MWCNT carpet and partial particle coverage are present when the catalyst is prepared without surfactant. Most of the tubes grow in the edge plane and fewer in the basal plane of the graphite particles. TGA analyses in FIG. 8, show lower MWCNT production in the HG material prepared without surfactant, as compared to FIG. 6.

Figure 9A:
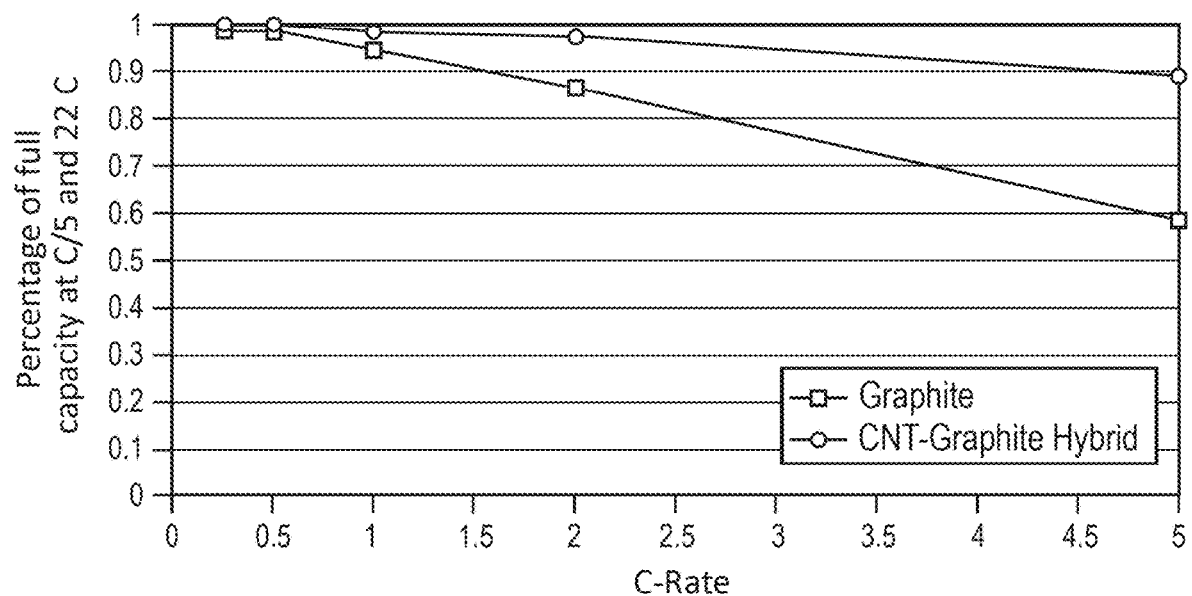
FIG. 9A is a comparison of CNT-graphite hybrid vs commercial graphite discharge rate at 22° C.
Figure 9B:
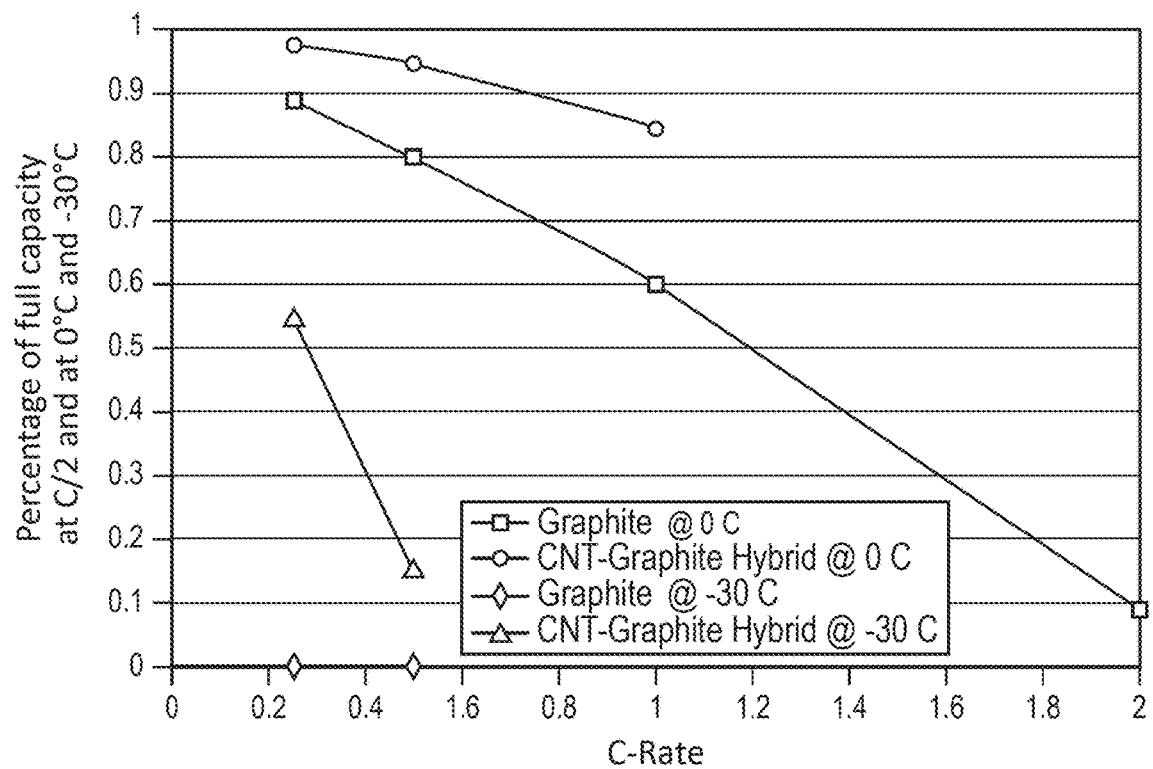
FIG. 9B is a comparison of CNT-graphite hybrid vs commercial graphite discharge rate at 0° C. and at −30° C.

The HG sample obtained using Triton X-100 surfactant was used in the fabrication of Li-ion anode. Battery performance tests were conducted at different temperatures. FIGS. 9A and 9B show the performance results obtained for HG and conventional graphite material used as a reference. As can be observed, HG material show higher energy capacity at different discharge rate capability at various temperatures.

Example 3

Figure 10A:
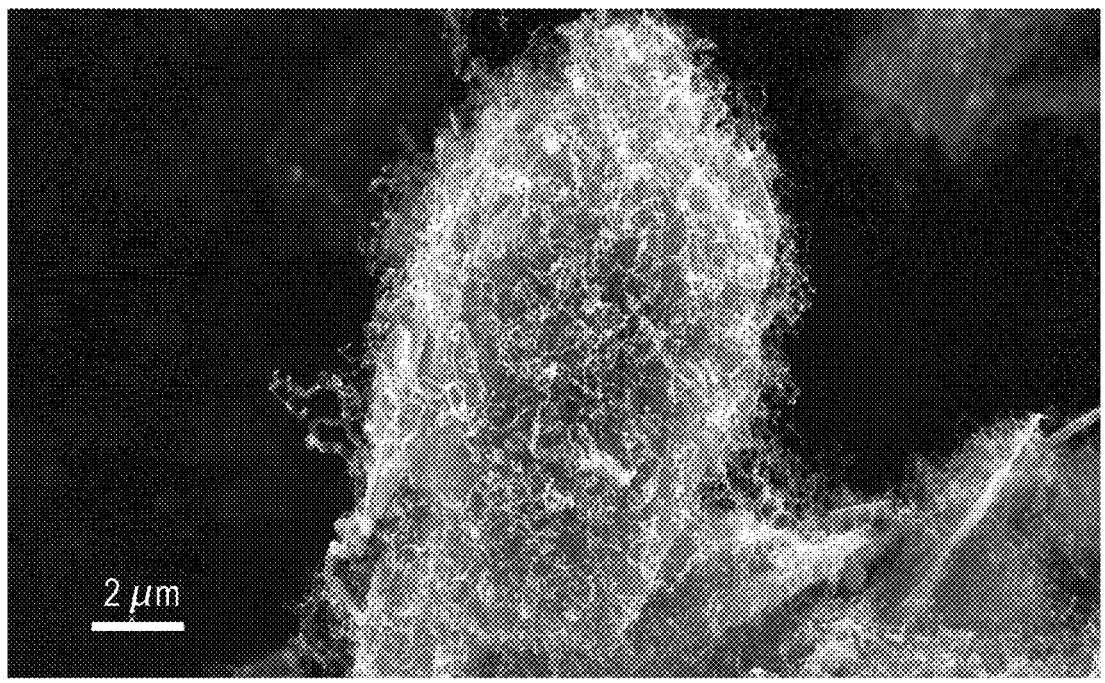
FIGS. 10A and 10B are SEM images of carbon nanotube graphite hybrid materials obtained at 3 minutes and 30 minutes reaction time, respectively.
Figure 10B:
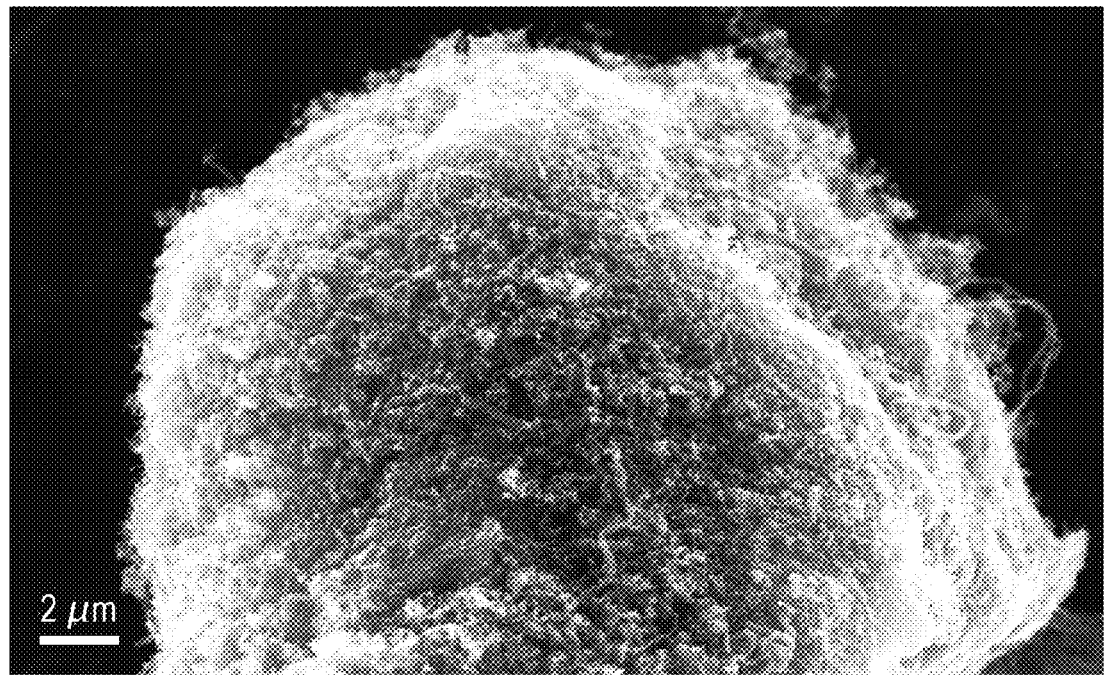

Effect of the Graphite Particle Size on the MWCNT Content and Surface Coverage, BET Surface Area and Pore Volume In this example, a graphite material having an approximate 5μ average particle size was used as a catalyst support. The catalyst was prepared using the same procedure as described in Example 1. The CNT synthesis was conducted in a rotary tube reactor. About 1 gram of catalyst was contacted with a 2 l/min of a gas flow of ethylene-H2 mixture (75% V ethylene) at 675 C for 3 minutes and for 30 minutes reaction time. FIGS. 10A and 10B show SEM images of the HG material obtained at 3 minutes and 30 minutes reaction times, respectively.

Figure 11:
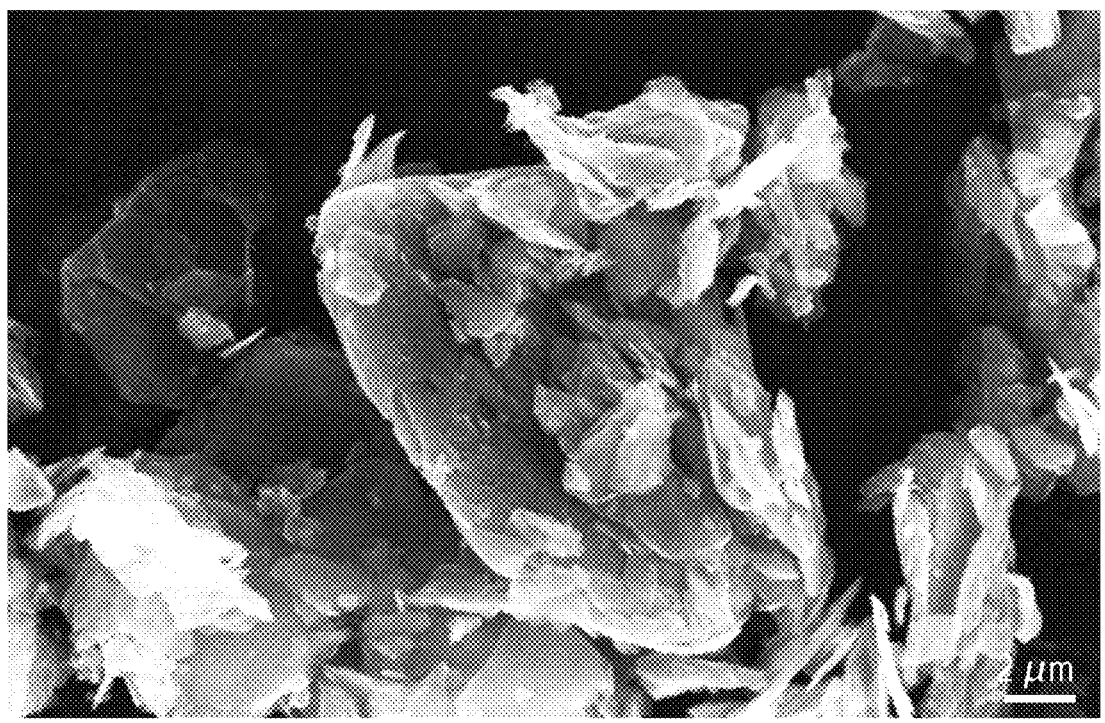
FIG. 11 is an SEM image of flakes of natural graphite having about 5 μm mean particle sizes.
Figure 12A:
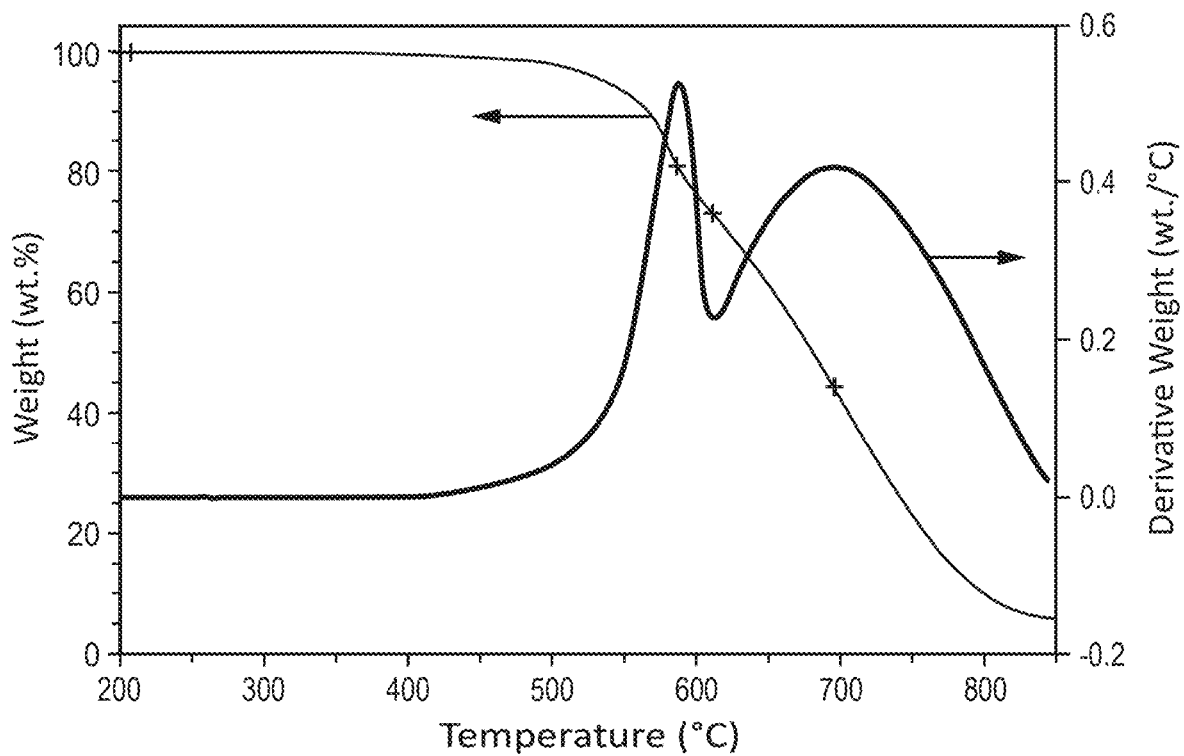
FIGS. 12A and 12B are thermogravimetric analyses corresponding to the carbon nanotube-graphite hybrid materials obtained using a rotary tube reactor at 3 minutes and 30 minutes reaction time, respectively.
Figure 12B:
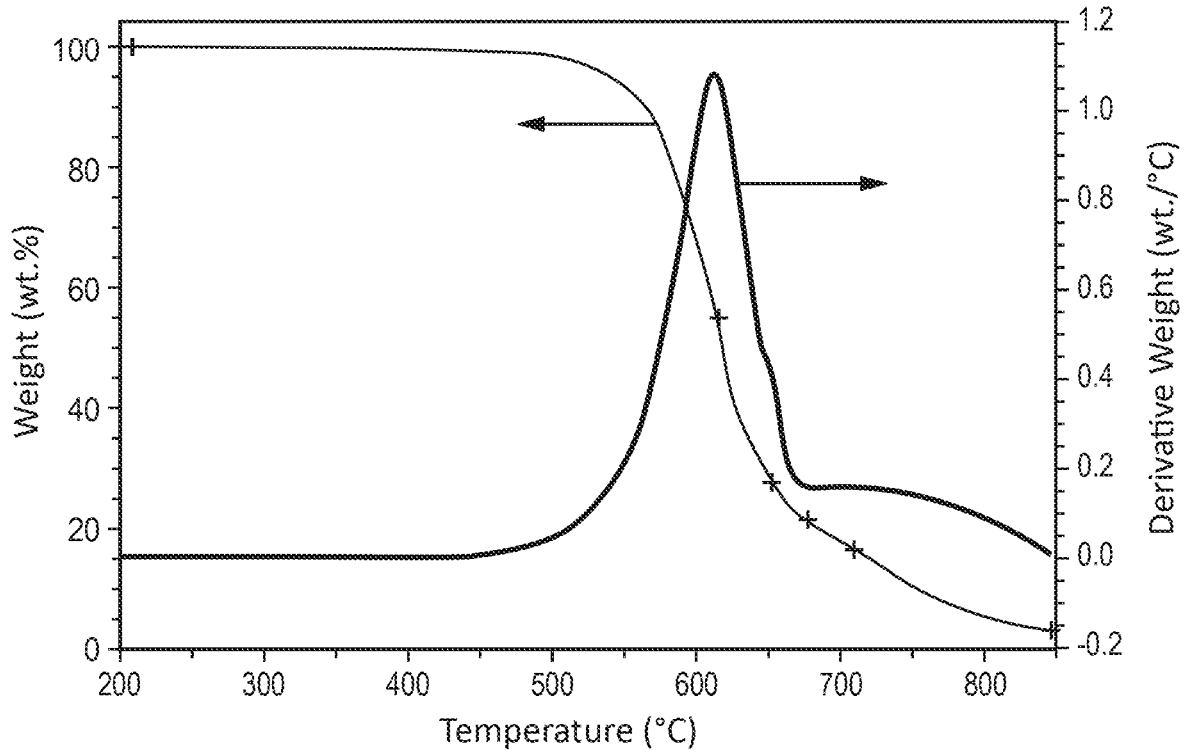

A high density CNT carpet can be observed in both samples. This carbon carpet density is higher than the HG material synthesized with 20 μu graphite particle size catalyst. The HG particles shows spherical shape, even though the starting graphite particles are not uniform (FIG. 11). This represents another competitive advantage vs conventional graphite material wherein graphite is submitted to spherization processes before its use in the electrode fabrication which increase its production cost. FIGS. 12A and 12B show thermogravimetric analyses corresponding to the carbon nanotube-graphite hybrid materials obtained at 3 minutes (FIG. 12A) and 30 minutes (FIG. 12B) reaction times (using a rotary tube reactor). The signals at about 600 C and 700 C correspond to CNT and graphite, respectively. The relative proportion CNT/graphite ratio composition increases when the reaction time increases.

Table 1 shows BET surface area, pore volume and MWCNT content of different graphite and HG synthesized hybrid materials. When decreasing the graphite particle sizes from 20 μu to 5 μu, the surface area and pore volume increase by a factor of about 3 and 1.8, respectively. Both surface area and pore volume importantly increase when MWCNTs grow on the graphite surface. This increase is more important when using small sizes of graphite particles. For 3 minutes reaction time, an important increase of surface area (361% increase) and pore volume (122%) and a significant amount of MWCNT deposited on the graphite surface (~22 wt. %) is observed. This represents another competitive advantage for the commercial production of these materials in reactors that operate in continuous mode.

Table 1 below illustrates properties of CNT-graphite hybrid materials synthesized from two different graphite materials. The differences are in mean particle size. When using 5-micron particle size graphite, the surface area and pore volume increases. The active metal surface dispersion increases because the surface area is higher. Therefore, higher CNT coverage is produced as Table 1 indicates.

TABLE 1

BET surface area, pore volume and MWCNT content of graphite and HG hybrid materials.

| | BET S.A (m²/g) | Surface area increase (%) | Pore volume (cc/g) | Pore volume increase (%) | Estimated % MWCNT |
|---|---|---|---|---|---|
| Graphite 20 μ | 6 | | 0.033 | | — |
| HG - 20 μ 5' reaction | 18 | 200 | 0.074 | 124 | 12 |
| Graphite 5 μ | 18 | 200 | 0.058 | 76 | — |
| HG - 3' reaction | 83 | 361 | 0.129 | 122 | 22 |
| HG - 30' reaction | 122 | 578 | 0.253 | 336 | 70 |

FIGS. 12A and 12B show the results of TGA analysis corresponding to the CNT-graphite hybrid materials which were obtained in a rotary tube reactor using graphite having a particle size of about 5 microns at 3 and 10 minutes reaction time, respectively. The CNT content increases dramatically with reaction time.

Example 4

Fluidized Bed Vs Rotary Reactor

Figure 13:
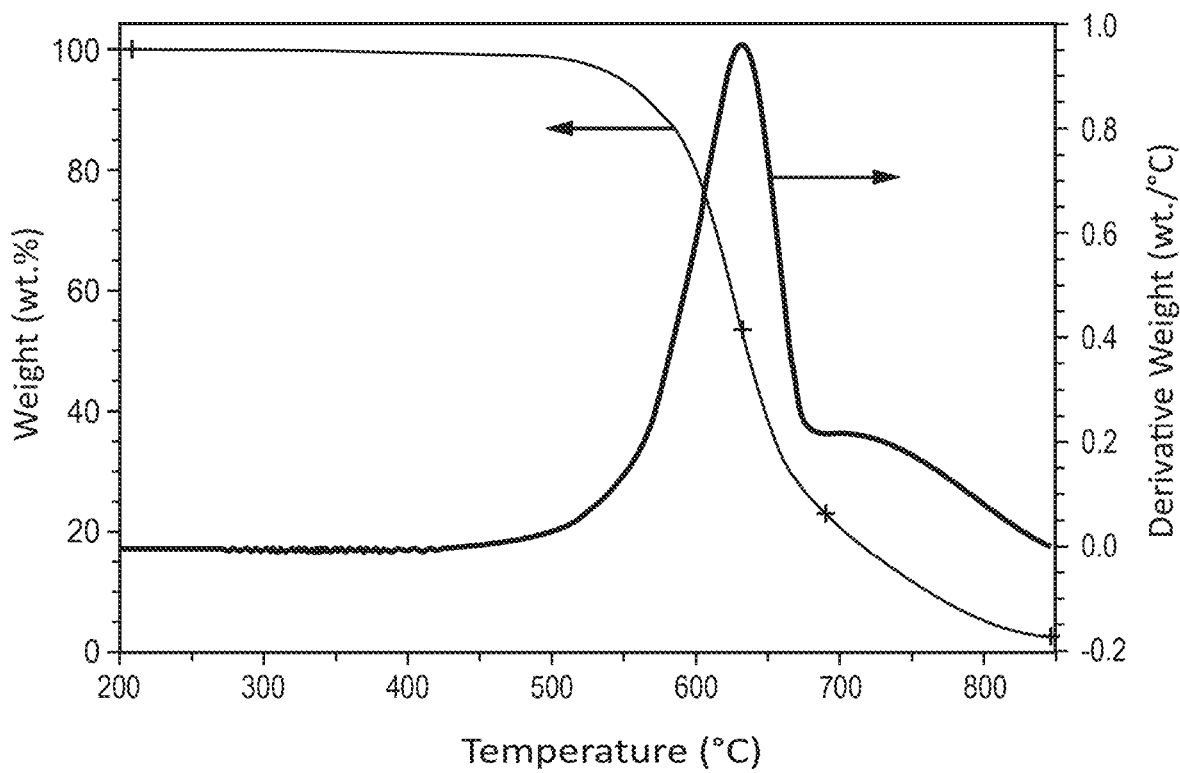
FIG. 13 is a thermogravimetric analysis of a carbon nanotube-graphite hybrid material synthesized in a fluidized bed reactor.

In this example, the catalyst prepared in example 3 was loaded into a fluidized bed reactor and the synthesis conditions were the same as described in Example 1. FIG. 13 shows the TGA analysis obtained for the fluidized bed CNT-graphite hybrid materials, using graphite having a particle size of about 5 microns and a 10 minute reaction time. This TGA analysis is comparable to that of FIG. 12B. As can be seen, both reactors produce materials having similar TGA pattern (MWCNT content and thermal stability) which demonstrates the flexibility of the production processes that can be used herein.

Example 5

Hairy Carbon Black

In this example, the CoFe surfactant solution of Example 1 was contacted with a conducting carbon black substrate. In this case 5 grams of the carbon catalyst support was impregnated using an excess of solution (1 gram solid/10 ml solution) at 55° C. for 2 h, and then the solvent was removed from the solid by using freeze-drying equipment. The dry powder obtained was loaded into a rotary kiln reactor, and then a $N_2$ gas flow was introduced to remove the air from the system. The system was heated up to 675° C. under $N_2$ flow, and then a flow of ethylene (1.5 L/min) was introduced into the reactor. The system remained under the same conditions for about 30 minutes. The reactor was cooled down under $N_2$ flow (2 l/min) to room temperature.

Figure 14A:
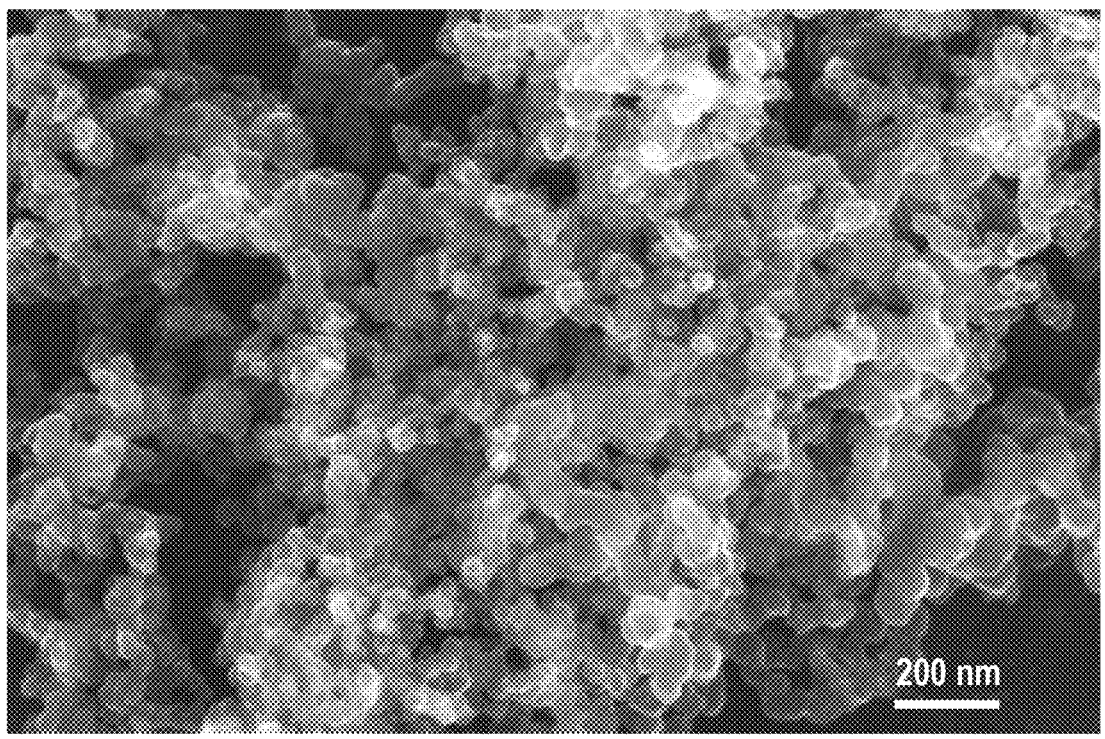
FIG. 14A is an SEM image of conductive carbon.
Figure 14B:
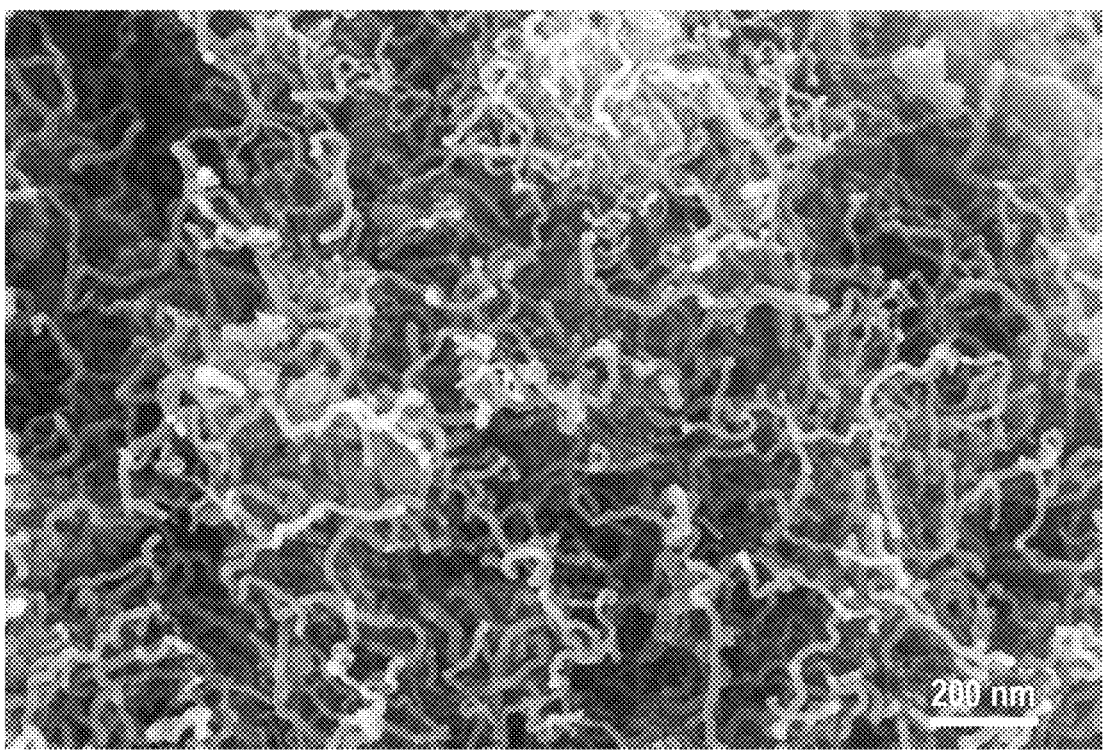
FIG. 14B is an SEM image of a carbon nanotube-conductive carbon hybrid material.

FIG. 14A shows the results of the SEM analysis corresponding to the carbon black material (Carbon Super-P material). FIG. 14B is an SEM of a carbon black-CNT hybrid material prepared from the carbon black of FIG. 14A, as described above. The carbon black is composed of chains of elementary spherical particles having diameter between 30 to 60 nm and grain sizes in the 5 to 20 μu range. When starting the CNT growth, the chains of spherical carbon begin to separate from each other and a carpet of MWCNT having diameter between 10-20 nm is formed.

Example 6

Hairy Activated Carbon

Figure 15:
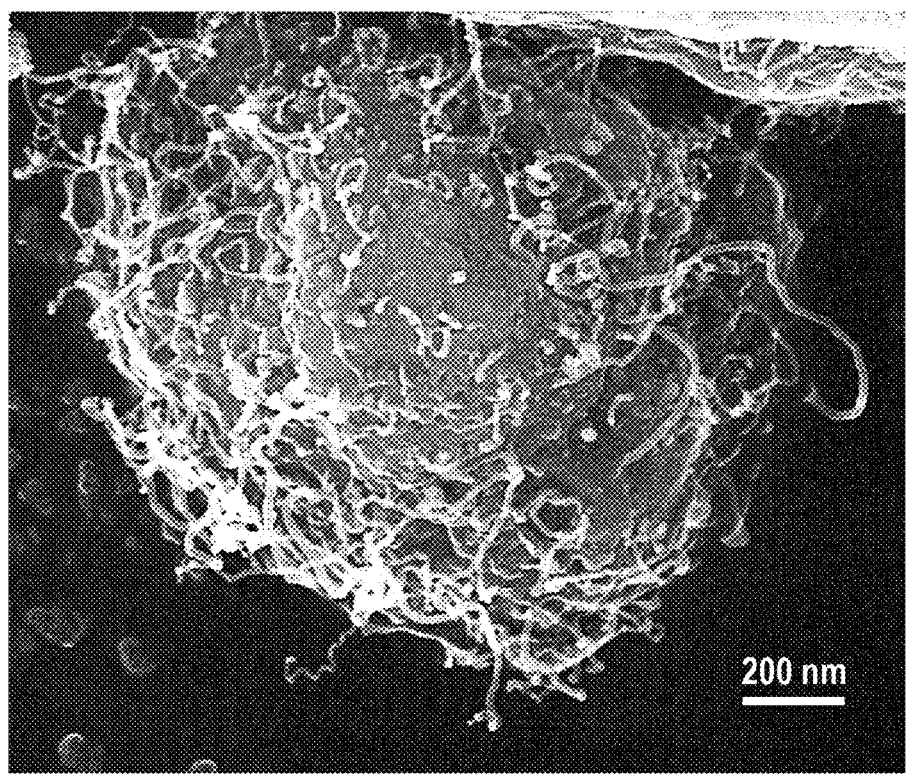
FIG. 15 is an SEM image of a to carbon nanotube-activated carbon hybrid material.

In this example, a CoFe supported on activated carbon (CEP21KS from Power Carbon Technology Co., Ltd, Korea) was prepared following the same procedure as described in Example 1. This catalyst support shows a BET surface area and pore volume of about 1649 m²/g and 0.91 cc/g, respectively, and a maximum rate of oxidation at 620° C. About 60% of the pores have diameter smaller than 2 nm. This represents a micropore area of about 1000 m²/g (0.54 cc/pore volume). The outer diameter of MWCNTs is about 10 to 20 nm. The MWCNT growth occurs in the external surface area of the carbon particles. This is evidenced by the SEM image shown in FIG. 15 that clearly illustrate the MWCNT formation on the external surface of the carbon particles.

Example 7

SWCNT-Graphite Hybrid

For this example, the 5μ graphite material was contacted with a solution containing cobalt nitrate, ammonium heptamolybdate (Mo:Co molar ratio 1:1 and 2:0) and 0.5 wt. % Triton X-100 surfactant aqueous solution. A smooth paste was formed after mixing in a high-speed mixer apparatus. After a 6-hour aging, the solid was dried using freeze-drying equipment. The SWCNT synthesis was conducted using a rotary kiln reactor. The catalyst was activated by reduction of the metals under H2 flow at 550° C. for 30 minutes. After the activation step, the temperature in the reactor was raised to 700° C. under nitrogen flow and then a flow of CO was introduced for the SWCNT synthesis for 30 minutes.

Figure 16:
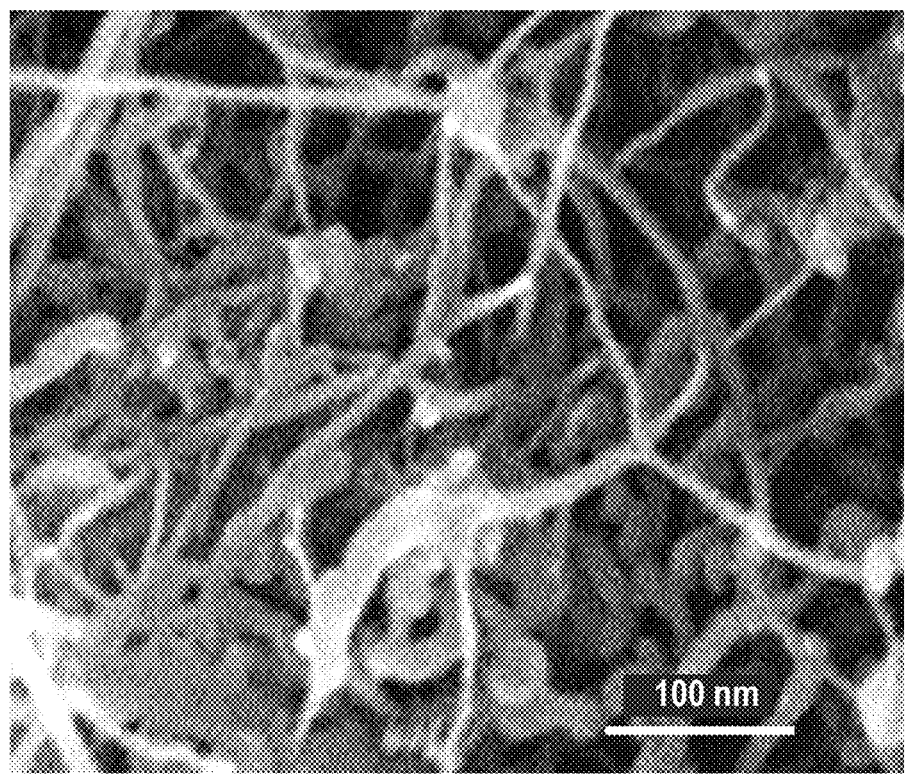
FIG. 16 is an SEM image showing SWCNT bundles in a graphite hybrid material.
Figure 17:
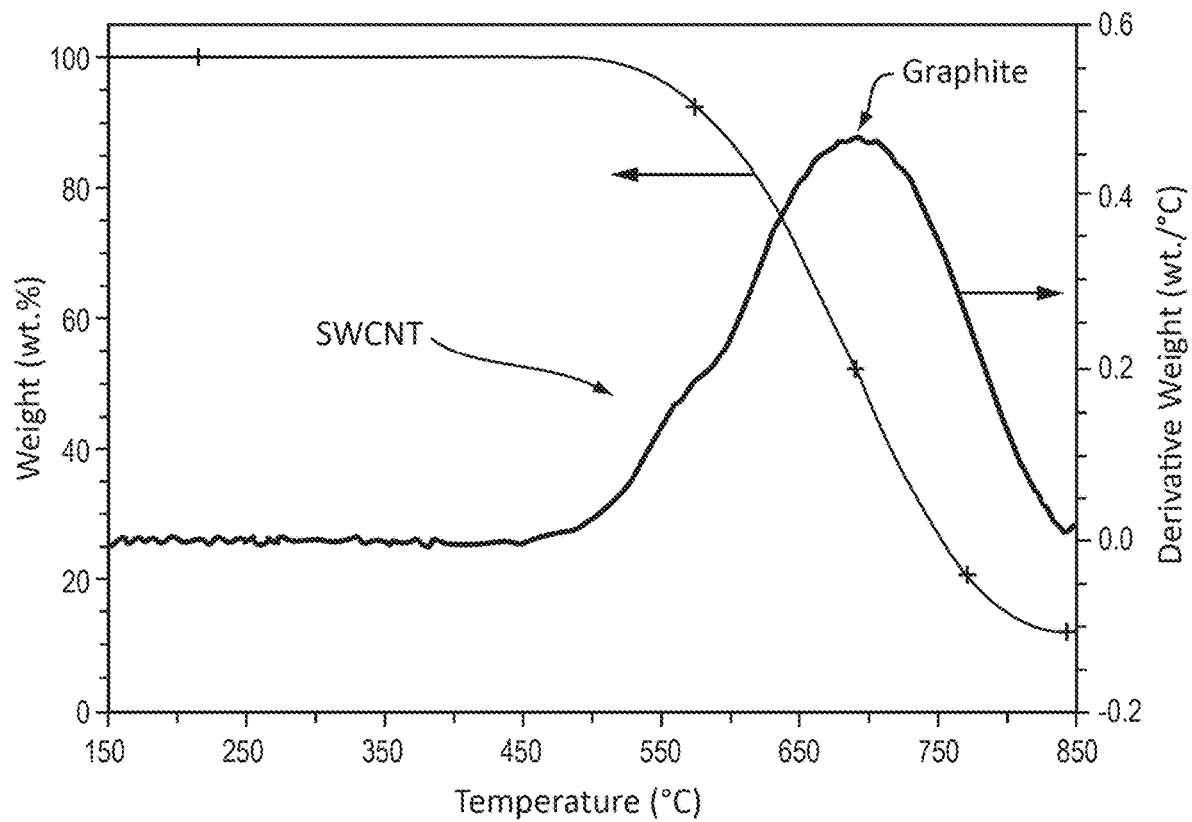
FIG. 17 is a thermogravimetric analysis of a SWCNT-Graphite hybrid material.
Figure 18:
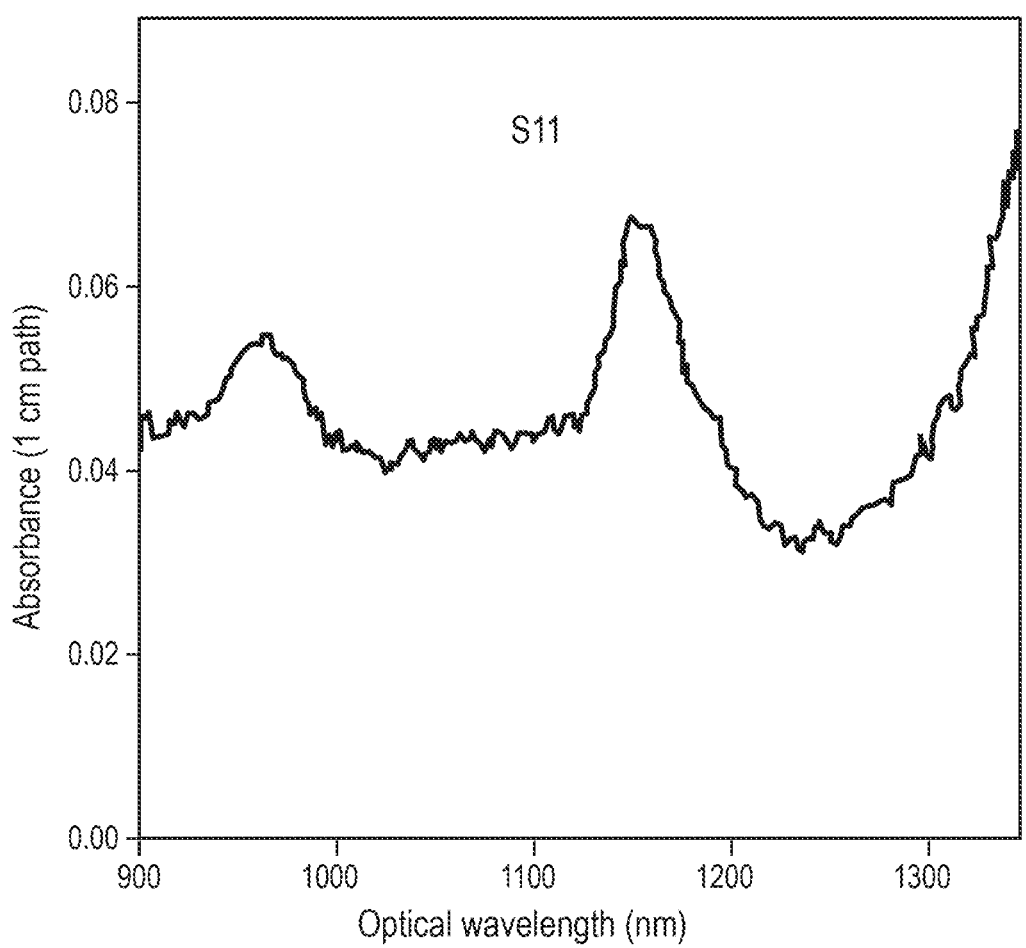
FIG. 18 illustrates optical absorption spectra of a SWCNT-Graphite hybrid material.

The SEM image in FIG. 16 shows bundles of SWCNT having 2 to 9 nm diameter. Thermogravimetric analysis in FIG. 17 shows graphite and SWCNT-graphite hybrid material. The appearance of a second signal at around 550° C. is attributed to the presence of CNTs. Near Infrared Fluorescence (NIRF) analysis was conducted in order to confirm the presence of SWCNTs in the hybrid material, as suggested by the SEM, TGA and optical absorption spectra of FIGS. 16 to 18, respectively. The results showed high-intensive emission peaks in the 8,000 to 11,000 $cm^{-1}$ optical frequency range when using 532 nm, 638 nm, 671 nm, and 785 nm lasers. The integration of the combined signals showed that the hybrid material mainly contains (6,5), (7,5), (9,4) and (8,3) semiconducting SWCNTs in the 41%, 17%, 15% and 13% proportions, respectively.

A number of implementations have been described. Nevertheless, it will be understood that additional modifications may be made without departing from the scope of the inventive concepts described herein, and, accordingly, other examples are within the scope of the following claims.

What is claimed is:

1. A method of producing a carbon-carbon nanotube (CNT) hybrid material, comprising:
providing carbon particles;
catalyzing the carbon particles by dispersing a metal catalyst on the surface of the carbon particles using an aqueous metal salt solution and a surfactant; and
exposing the catalyzed carbon particles to a carbon-containing gas, to grow carbon nanotubes (CNTs) at catalyst sites and thus create the carbon-CNT hybrid material, wherein the CNT comprises from 12 to 70 weight percent of the hybrid material, and wherein the catalyzed carbon particles are made more spherical by the 12 to 70 weight percent CNTs that are grown on the catalyzed carbon particles.

2. The method of claim 1, wherein the surfactant is non-ionic.

3. The method of claim 1, wherein a fluidized bed reactor or a rotary kiln reactor is used to grow the CNTs.

4. The method of claim 1, wherein the method is effective to convert graphite flakes to more spheroidized structures.

5. The method of claim 1, wherein the CNTs have a length in the range of about 3 microns to about 10 microns, a diameter of from about 10 nm to about 50 nm, and a length to diameter aspect ratio of from about 60 to about 1000.

6. The method of claim 1, further comprising removing the surfactant from the carbon particles by pyrolysis in an inert gas flow, before the exposing step.

7. A method of producing a graphite-carbon nanotube (CNT) hybrid material, comprising:
providing graphite flakes;
catalyzing the graphite flakes by dispersing a metal catalyst on the surface of the graphite flakes using an aqueous metal salt and surfactant solution; and
exposing the catalyzed graphite flakes to a carbon-containing gas, to grow carbon nanotubes (CNTs) at catalyst sites and thus create the graphite-CNT hybrid material, wherein the CNT comprises from 12 to 70 weight percent of the hybrid material, and wherein the catalyzed graphite flakes are made more spherical by the 12 to 70 weight percent CNTs that are grown on the catalyzed graphite flakes.

8. The method of claim 7, wherein the surfactant is non-ionic.

9. The method of claim 7, further comprising removing the surfactant from the graphite flakes by pyrolysis in an inert gas flow, before the exposing step.

* * * * *